(12) United States Patent
Lee et al.

(10) Patent No.: US 11,825,305 B2
(45) Date of Patent: Nov. 21, 2023

(54) DEVICE CHANGING METHOD AND APPARATUS OF WIRELESS COMMUNICATION SYSTEM

(71) Applicant: Samsung Electronics Co., Ltd., Suwon-si (KR)

(72) Inventors: Duckey Lee, Suwon-si (KR); Jonghan Park, Suwon-si (KR); Sujung Kang, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 17/418,111

(22) PCT Filed: Feb. 13, 2020

(86) PCT No.: PCT/KR2020/002025
§ 371 (c)(1),
(2) Date: Jun. 24, 2021

(87) PCT Pub. No.: WO2020/171475
PCT Pub. Date: Aug. 27, 2020

(65) Prior Publication Data
US 2022/0078615 A1 Mar. 10, 2022

(30) Foreign Application Priority Data

Feb. 19, 2019 (KR) .......... 10-2019-0019523
Apr. 24, 2019 (KR) .......... 10-2019-0047720
Sep. 25, 2019 (KR) .......... 10-2019-0118180

(51) Int. Cl.
*H04W 12/069* (2021.01)
*H04W 12/40* (2021.01)
*H04W 8/20* (2009.01)

(52) U.S. Cl.
CPC .......... *H04W 12/069* (2021.01); *H04W 8/20* (2013.01); *H04W 12/40* (2021.01)

(58) Field of Classification Search
CPC ..... H04W 12/069; H04W 8/20; H04W 12/40; H04W 8/183; H04W 4/60; H04W 8/205; H04L 67/303
See application file for complete search history.

(56) References Cited

U.S. PATENT DOCUMENTS 9,232,392 B2  1/2016  Lee et al.
9,712,996 B2  7/2017  Park
(Continued)

FOREIGN PATENT DOCUMENTS

KR  10-2014-0086950 A  7/2014
KR  10-2014-0140882 A  12/2014
(Continued)

OTHER PUBLICATIONS

European Search Report dated Feb. 9, 2022, issued in European Application No. 20758847.6.
(Continued)

*Primary Examiner* — Mazda Sabouri
(74) *Attorney, Agent, or Firm* — Jefferson IP Law, LLP

(57) ABSTRACT

The present disclosure relates to a communication technique for converging IoT technology with a 5G communication system for supporting a higher data transmission rate beyond a 4G system, and a system therefor. A method and an apparatus for enabling inter-device profile movement using only two devices without separately carrying out identity verification or ID authentication verification are provided. The method includes receiving an input for moving a first profile installed in a first terminal, deleting the first profile on a first eUICC, generating, for data including first profile information, digital signature data of the first eUICC, and (Continued)

displaying data including the first profile information and the corresponding digital signature data as a QR code on a screen of the first terminal.

15 Claims, 22 Drawing Sheets

(56) References Cited

U.S. PATENT DOCUMENTS

| | | | |
|---|---|---|---|
| 10,064,047 | B2 | 8/2018 | Park et al. |
| 10,075,205 | B2 | 9/2018 | Lee et al. |
| 2016/0241537 | A1* | 8/2016 | Cha .................. H04L 63/20 |
| 2016/0301529 | A1* | 10/2016 | Park .................. H04W 8/205 |
| 2019/0020997 | A1 | 1/2019 | Park |
| 2019/0075453 | A1* | 3/2019 | Yoon ................. H04W 8/245 |
| 2019/0335319 | A1* | 10/2019 | Li ..................... H04W 8/18 |

FOREIGN PATENT DOCUMENTS

| | | | |
|---|---|---|---|
| KR | 10-2015-0122018 A | 10/2015 | |
| KR | 10-2016-0020816 A | 2/2016 | |
| KR | 10-2017-0077489 A | 7/2017 | |
| WO | 2017/220154 A1 | 12/2017 | |

OTHER PUBLICATIONS

Indian Office Action dated Jan. 17, 2023, issued in Indian Patent Application No. 202137029605.
European Office Action dated Jul. 20, 2023, issued in European Patent Application No. 20 758 847.6-1216.

* cited by examiner

DEVICE CHANGING METHOD AND APPARATUS OF WIRELESS COMMUNICATION SYSTEM

CROSS-REFERENCE TO RELATED APPLICATION(S)

This application is a U.S. National Stage application under 35 U.S.C. § 371 of an International application number PCT/KR2020/002025, filed on Feb. 13, 2020, which is based on and claims priority of a Korean patent application number 10-2019-0019523, filed on Feb. 19, 2019, in the Korean Intellectual Property Office, of a Korean patent application number 10-2019-0047720, filed on Apr. 24, 2019, in the Korean Intellectual Property Office, and of a Korean patent application number 10-2019-0118180, filed on Sep. 25, 2019, in the Korean Intellectual Property Office, the disclosure of each of which is incorporated by reference herein in its entirety.

TECHNICAL FIELD

The disclosure relates to a wireless communication system and, more particularly, to a method and an apparatus for reinstalling access information for accessing a communication system in a device in the wireless system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A universal integrated circuit card (UICC) is a smart card which is inserted into a mobile communication terminal or the like for use and is referred to as a UICC card. An access control module for accessing a network of a mobile communication service provider may be included in the UICC. Examples of the access control module include a universal subscriber identity module (USIM), a subscriber identity module (SIM), and an IP multimedia service identity module (ISIM). A UICC including a USIM is commonly referred to as a USIM card. Similarly, a UICC including a SIM is commonly referred to as a SIM card. In the following disclosure described, a SIM card will be used in a general sense to include a UICC card, a USIM card, a UICC including an ISIM, and the like. That is, even though a SIM card is referred to, technical application thereof can be equally applied to a USIM card, an ISIM card, or a general UICC card.

The SIM card may store personal information on a mobile communication subscriber and enables the use of secure mobile communication via subscriber authentication and traffic security key generation in accessing to a mobile communication network.

The SIM card is generally manufactured as a dedicated card for a particular mobile communication operator by request of the operator at the time of manufacture of the card and is released with authentication information of the operator for network access, for example, a universal subscriber identity module (USIM) application, an international mobile subscriber identity (IMSI), a K value, and a OPc value, loaded in advance. The mobile communication operator receives the manufactured SIM card and provides the SIM card for a subscriber. If necessary, it is possible to manage, for example, install, modify, or delete, an application in the UICC card using an over-the-air (OTA) technology or the like. The subscriber may insert the UICC card into a mobile communication terminal to use a network and an application service of the mobile communication operator. When the existing terminal is replaced with a new terminal, the subscriber can insert the UICC card into the new terminal, thereby using the same authentication information, mobile phone number, and personal contacts as stored in the UICC card in the new terminal.

However, the SIM card inconveniences a mobile communication terminal user in receiving a service from a different mobile communication service provider. A mobile communication terminal user inconveniently needs to physically obtain a SIM card in order to receive a service from a mobile communication service provider. For example, when traveling to a foreign country, a local SIM card needs to be inconveniently obtained in order to receive a local mobile communication service. A roaming service can solve this inconvenience to some extent, but entails expensive rates and cannot be received if there is no contract made between communication service providers.

This inconvenience may be largely solved by remotely downloading and installing a SIM in a UICC card. That is, a user can download a SIM of a mobile communication service for use to a UICC card at a desired time. The UICC card can download and install a plurality of SIMs, and can select and use only one SIM among the SIMs. The UICC card may or may not be fixed to a terminal.

The physical shape and logical functions of the UICC card are defined by a standardization organization called European Telecommunications Standards Institute (ETSI), and thus the UICC card maintains international compatibility. From the aspect of a form factor that defines a physical phenomenon, the size of a SIM is gradually reduced from a mini SIM, which is the most widely used, and a micro SIM to a recent nano SIM. Although small-sized SIMs contribute to the miniaturization of mobile communication terminals, UICC cards with a size smaller than that of the recently established nano SIM are expected to be difficult to standardize due to user concerns about loss. Further, since a space for mounting a detachable slot is required in a terminal in view of characteristics of a detachable UICC card, it is expected that further miniaturization is difficult.

In order to solve this problem, there is a demand for replacing a UICC by embedding a security module performing a function similar to that of the UICC in a mobile communication terminal when manufacturing the terminal. In response to this demand, an embeded universal integrated circuit card (eUICC) structure, which is a UICC that is not detachable, is proposed.

A UICC fixed to a terminal for use is referred to an embedded UICC (eUICC). Typically, an eUICC refers to a UICC card that is fixed to a terminal for use and can remotely download and select a SIM from a profile server. In the disclosure, UICC cards that can remotely download and select a SIM are collectively referred to as eUICCs. That is, among UICC cards that can remotely download and select a SIM, a UICC card fixed to a terminal and a UICC card not fixed to a terminal are collectively referred to as eUICCs. In addition, SIM information to be downloaded will be collectively referred to as the term "eUICC profile".

When replacing a terminal, a subscriber may transfer an SIM card from the old terminal to a new terminal, thereby accessing the same mobile communication network using authentication information stored in the UICC card. However, in a terminal having an eUICC installed, a downloaded SIM is decrypted and installed only in the eUICC and cannot be externally extracted again after installation, causing inconvenience when the terminal is replaced.

Conventionally, when a SIM card is lost, mobile carriers provide a procedure of reissuing the SIM card through a subscriber identity or ID authentication process. This process may be applied to an eUICC when replacing a terminal. However, to prevent misuse, such as hacking/stealing of a phone number, a subscriber usually needs to visit an offline shop to deal with the identity or ID authentication process, or needs to experience a strict online ID authentication process. Further, there are few official methods for the ID authentication process, making it difficult to deal with the process.

DISCLOSURE OF INVENTION

Technical Problem

A technical aspect of the disclosure is to provide a method and an apparatus for transferring a profile installed in a first terminal to a second terminal.

A technical aspect of the disclosure is to provide a downloading method that does not require separate ID authentication when a new terminal changed via terminal replacement in a communication system downloads a new eUICC profile corresponding to a profile stored in an eUICC of an existing terminal online and installs the new eUICC in order to connect to a communication service used by the existing terminal.

Solution to Problem

In view of the foregoing, an embodiment of the disclosure may provide a method performed by a first terminal including: receiving an input to transfer a profile installed in the first terminal; deleting the profile from a first universal integrated circuit card (UICC) of the first terminal; generating data including deletion information on the profile; and outputting the data as information obtainable by a second terminal, wherein the data may be used for the second terminal to obtain the profile.

In view of the foregoing, an embodiment of the disclosure may provide a method performed by a second terminal including: obtaining data including information on a profile deleted from a first universal integrated circuit card (UICC) of a first terminal; transmitting a first message including identification information on the profile and deletion information on the profile to a profile server based on the data; receiving metadata about the profile based on the identification information on the profile and the deletion information on the profile; transmitting a second message including a download request for the profile to the profile server based on the metadata; and downloading the profile from the profile server.

In view of the foregoing, an embodiment of the disclosure may provide a method performed by a profile server including: receiving a first message including identification information on a profile deleted from a first terminal and deletion information on the profile from a second terminal; generating metadata about the profile based on the identification information on the profile and the deletion information on the profile; transmitting the metadata to the second terminal; receiving a second message including a download request for the profile from the second terminal; and transmitting the profile to the second terminal.

In view of the foregoing, an embodiment of the disclosure may provide a first terminal including: a transceiver; a first universal integrated circuit card (UICC); and a controller configured to perform control to receive an input to transfer a profile installed in the first terminal, to delete the profile from a first UICC; to generate data including deletion information on the profile, and to output the data as information obtainable by a second terminal, wherein the data may be used for the second terminal to obtain the profile.

In view of the foregoing, an embodiment of the disclosure may provide a second terminal including: a transceiver; a second universal integrated circuit card (UICC); and a controller configured to perform control to obtain data including information on a profile deleted from a first UICC of a first terminal, to transmit a first message including identification information on the profile and deletion information on the profile to a profile server based on the data, to receive metadata about the profile based on the identification information on the profile and the deletion information on the profile, to transmit a second message including a download request for the profile to the profile server based on the metadata, and to download the profile from the profile server.

In view of the foregoing, an embodiment of the disclosure may provide a profile server including: a transceiver; and a controller configured to perform control to receive a first message including identification information on a profile deleted from a first terminal and deletion information on the profile from a second terminal, to generate metadata about the profile based on the identification information on the profile and the deletion information on the profile, to transmit the metadata to the second terminal, to receive a second message including a download request for the profile from the second terminal, and to transmit the profile to the second terminal.

In view of the foregoing, a method for a first terminal according to an embodiment of the disclosure may include: receiving an input to transfer a first profile installed in the first terminal; deleting the first profile from a first eUICC; generating digital signature data of the first eUICC for data including first profile information; and displaying data including the first profile information and the digital signature data as a QR code on a screen of the first terminal.

In view of the foregoing, a method for a second terminal according to an embodiment of the disclosure may include: scanning a QR code displayed on a screen of a first terminal; transmitting first profile information, digital signature data of a first eUICC, and digital signature data of a second eUICC to a profile server included in the QR code; and receiving and installing the profile from the profile server.

In view of the foregoing, a method for a profile server according to an embodiment of the disclosure may include: receiving first profile information, digital signature data of a first eUICC, and digital signature data of a second eUICC from a second terminal; verifying the digital signature data of the second eUICC; verifying the digital signature data of the first eUICC; and transmitting a first profile to the second terminal.

The technical subjects pursued in the disclosure may not be limited to the above-mentioned technical subjects, and other technical subjects which are not mentioned may be clearly understood, through the following descriptions, by those skilled in the art to which the disclosure pertains.

Advantageous Effects of Invention

According to various embodiments of the disclosure, it is possible to provide a method and an apparatus for transferring a profile installed in a first terminal to a second terminal.

According to various embodiments of the disclosure, it is possible to conveniently transfer an SIM between devices by manipulating only an existing terminal and a new terminal without additional identification or ID confirmation when a terminal having an eUICC installed therein is replaced in a communication system.

MODE FOR THE INVENTION

Figure 1A:
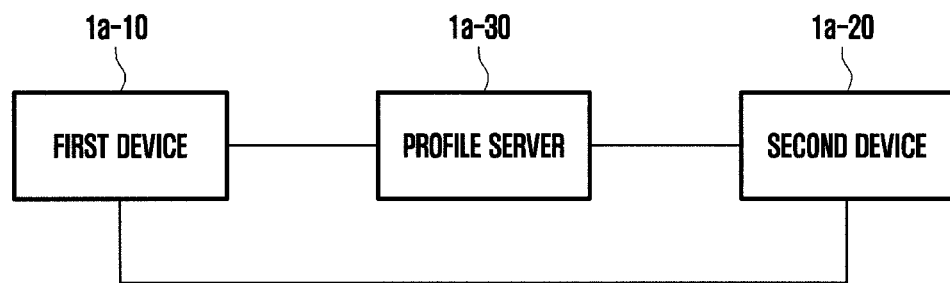
FIG. 1A illustrates an example of the configuration of a communication system to which an embodiment of the disclosure is applied.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

First, terms used herein are defined.

In this specification, a UICC is a smart card that is inserted into a mobile communication terminal for use and refers to a chip that stores personal information on a mobile communication subscriber, such as network access authentication information, a telephone directory, or an SMS, and performs subscriber authentication and traffic security key generation to enable the secure use of mobile communication when accessing a mobile communication network, such as a GSM, WCDMA, or LTE. A communication application, such as a subscriber identification module (SIM), a universal SIM (USIM), or an IP multimedia SIM (ISIM), may be installed in the UICC depending on the type of a mobile communication network to which the subscriber connects, and the UICC may provide a high-level security function for installing various applications, such as an electronic wallet, a ticketing application, or an electronic passport.

In this specification, an embedded UICC (eUICC) is a chip-type security module embedded in a terminal rather than a detachable type that can be inserted into and removed from a terminal. The eUICC can download and install a profile using an over-the-air (OTA) technology. The eUICC may be referred to as a UICC capable of downloading and installing a profile.

In this specification, a method of downloading and installing a profile in an eUICC using the OTA technology may also be applied to a detachable UICC that can be inserted into and removed from a terminal. That is, an embodiment of the disclosure may be applied to a UICC that can download and install a profile using the OTA technology.

In this specification, the term "UICC" may be used interchangeably with the term "SIM", and the term "eUICC" may be used interchangeably with the term "eSIM".

In this specification, a profile may refer to a packaged software form of an application, a file system, and an authentication key value stored in a UICC. The profile may be referred to as access information.

In this specification, a USIM profile may have the same meaning as a profile or may refer to a packaged software form of information included in a USIM application in the profile.

In this specification, a profile server may include a function of generating a profile, encrypting a generated profile, generating a profile remote management instruction, or encrypting a generated profile remote management instruction and may be expressed as subscription manager data preparation (SM-DP), subscription manager data preparation plus (SM-DP+), or subscription manager secure routing (SM-SR).

The term "terminal" or "device" used herein may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of a terminal may include a cellular phone, a smartphone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a music storage and playback appliance having a wireless communication function, an Internet appliance capable of wireless Internet access and browsing, and portable units or terminals incorporating combinations of these functions. In addition, the terminal may include a machine-to-machine (M2M) terminal and a machine-type communication (MTC) terminal/device but is not limited thereto. In this specification, the terminal may be referred to as an electronic device or simply a device.

In this specification, a terminal or device may include software or an application installed in the terminal or device to control the UICC or eUICC. The software or application may be referred to as, for example, a local profile assistant (LPA).

In this specification, an eUICC identifier (eUICC ID) may be a unique identifier of an eUICC embedded in a terminal and may be referred to as an EID.

In this specification, an application protocol data unit (APDU) may be a message for a terminal or a controller in a device to interwork with an eUICC.

In this specification, a profile package may be interchangeably used with a profile or may be used as a term indicating a data object of a specific profile and may be referred to as a profile TLV or profile package TLV. A profile package that is encrypted using an encryption parameter may be referred to as a protected profile package (PPP) or a protected profile package TLV (PPP TLV). A profile package encrypted using an encryption parameter that can be decrypted only by a specific eUICC may be referred to as a bound profile package (BPP) or a bound profile package TLV (BPP TLV). A profile package TLV may be a data set representing information forming a profile in a tag-length-value (TLV) format.

In this specification, AKA may represent authentication and key agreement and may refer to an authentication algorithm for accessing 3GPP and 3GPP2 networks.

In this specification, K is an encryption key value stored in an eUICC used for an AKA authentication algorithm.

In this specification, OPc is a parameter value that can be stored in an eUICC used for an AKA authentication algorithm.

In this specification, an NAA is a network access application and may be an application program, such as USIM or ISIM, stored in a UICC to access a network. The NAA may be a network access module.

When detailed descriptions about related known functions or configurations are determined to make the gist of the disclosure unclear in describing the disclosure, the detailed descriptions will be omitted herein.

Hereinafter, proposed embodiments will be described with reference to drawings.

In various embodiments of the disclosure, a first device may be interchangeably used with a first terminal or device 1, and a second device may be interchangeably used with a second terminal or device 2.

FIG. 1A illustrates an example of the configuration of a communication system to which an embodiment of the disclosure is applied.

Referring to FIG. 1A, the communication system to which the embodiment of the disclosure is applied includes a first device 1a-10, a profile providing server 1a-30, and a second device 1a-20. The first device 1a-10 may be defined as a first terminal, and the second device 1a-20 may be defined as a second terminal.

The first device 1a-10 may download and install a profile from the profile server 1a-30, may delete the installed profile to transfer the profile, and may provide information on the deleted profile and verification information for verifying deletion of the profile to the second device 1a-20.

The second device 1a-20 may receive the information on the profile and the verification information on the deletion of the profile from the first device 1a-10, may transmit a request message including the information and a signature of the second device to the profile server, and may receive and install the profile from the profile server 1a-30.

The profile providing server 1a-30 verifies the deletion of the profile that has been installed in the first device 1a-10 through the request from the second device 1a-20 and transmits the profile to the second device so that the profile can be installed. In addition, when receiving a profile deletion request event of requesting deletion of a profile through an input unit (user interface unit) of software or an application (e.g., a local profile assistant (LPA)) installed in the terminal or device to control a UICC or an eUICC, each of the first terminal and the second terminal according to an embodiment of the disclosure deletes the profile and transmits a message indicating that the profile has been deleted to the profile providing server 1a-30. Accordingly, the profile providing server may manage the profile, which has been previously generated in the first terminal to provide a communication service, to be reused in the second terminal.

Figure 1B:
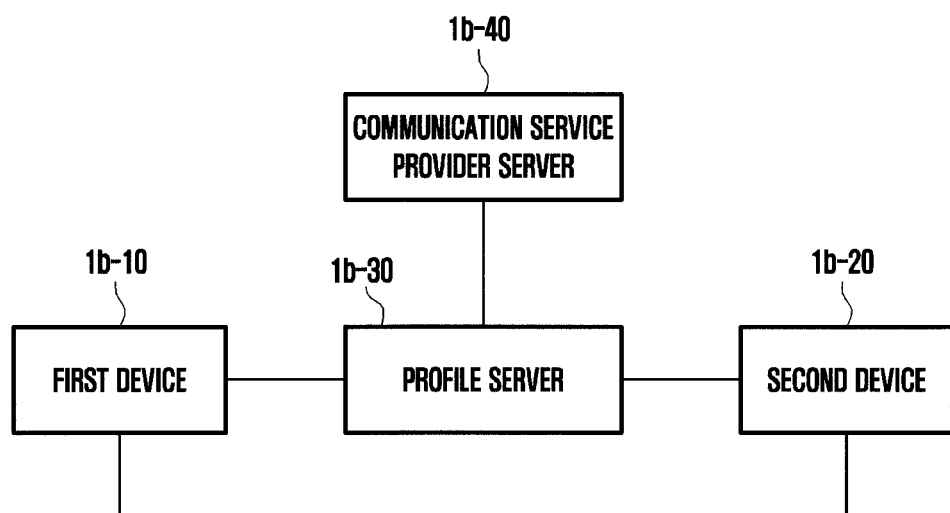
FIG. 1B illustrates an additional example of the configuration of a communication system to which an embodiment of the disclosure is applied.

FIG. 1B illustrates an additional example of the configuration of a communication system to which an embodiment of the disclosure is applied.

Referring to FIG. 1B, the communication system to which the embodiment of the disclosure is applied includes a first device 1b-10, a profile providing server 1b-30, and a second device 1b-20 as in FIG. 1A, and further includes a communication service provider server 1b-40 interworking with the profile server.

The operations of the first device 1b-10 and the second device 1b-20 of FIG. 1B are the same as those of FIG. 1A, and thus a description thereof is omitted. The profile providing server 1b-30 also operates in the same manner as in FIG. 1A to verify deletion of a profile that has been installed in the first device 1b-10 through a request from the second device 1b-20 and to transmit the profile to the second device 1b-20 so that the profile can be installed. Here, in the configuration of FIG. 1B, the profile server 1b-30 may additionally ask the communication service provider server 1b-40 whether to reinstall the deleted profile through a request, may receive a response from the communication service provider server 1b-40, and may then transmit the profile to the second device 1b-20 to enable the installation of the profile.

In the following embodiments, a description will be made with reference to a selection of the configuration of FIG. 1A or the configuration of 1B as needed. However, it should be noted that even though a description is made with reference to the configuration of FIG. 1A, the description may also be applied to operations applicable to the configuration of FIG. 1B.

Figure 1C:
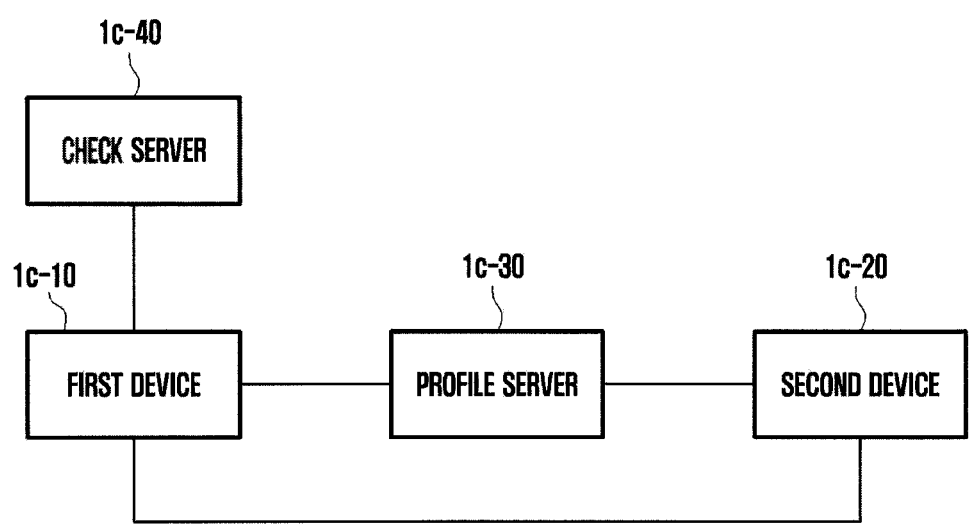
FIG. 1C illustrates an additional example of the configuration of a communication system to which an embodiment of the disclosure is applied.

FIG. 1C illustrates an additional example of the configuration of a communication system to which an embodiment of the disclosure is applied.

Referring to FIG. 1C, the communication system to which the embodiment of the disclosure is applied includes a first device 1c-10, a profile providing server 1c-30, and a second device 1c-20 as in FIG. 1A, and further includes a check server 1c-40 interworking with the first device 1c-10.

The operations of the profile server 1c-30 and the second device 1c-20 of FIG. 1C are the same as those of FIG. 1A, and thus a description thereof is omitted. The operation of the first device 1c-10 is also the same as in FIG. 1A. The first device 1c-10 may download and install a profile from the profile server 1c-30, may delete the installed profile to transfer the profile, and may provide information on the deleted profile and verification information for verifying deletion of the profile to the second device 1c-20.

Here, in the configuration of FIG. 1C, device 1 1c-10 performs a process of asking the separate check server 1c-40 whether the profile can be transferred before deleting the installed profile to transfer the profile and may delete the profile according to a query result. The check server 1c-40 may be the profile server 1c-30.

In the following embodiments, a description will be made with reference to a selection of the configuration of FIG. 1A, the configuration of 1B, or the configuration of FIG. 1C as needed. However, it should be noted that even though a description is made with reference to the configuration of FIG. 1A, the description may also be applied to operations applicable to the configuration of FIG. 1B or the configuration of FIG. 1C.

Figure 1D:
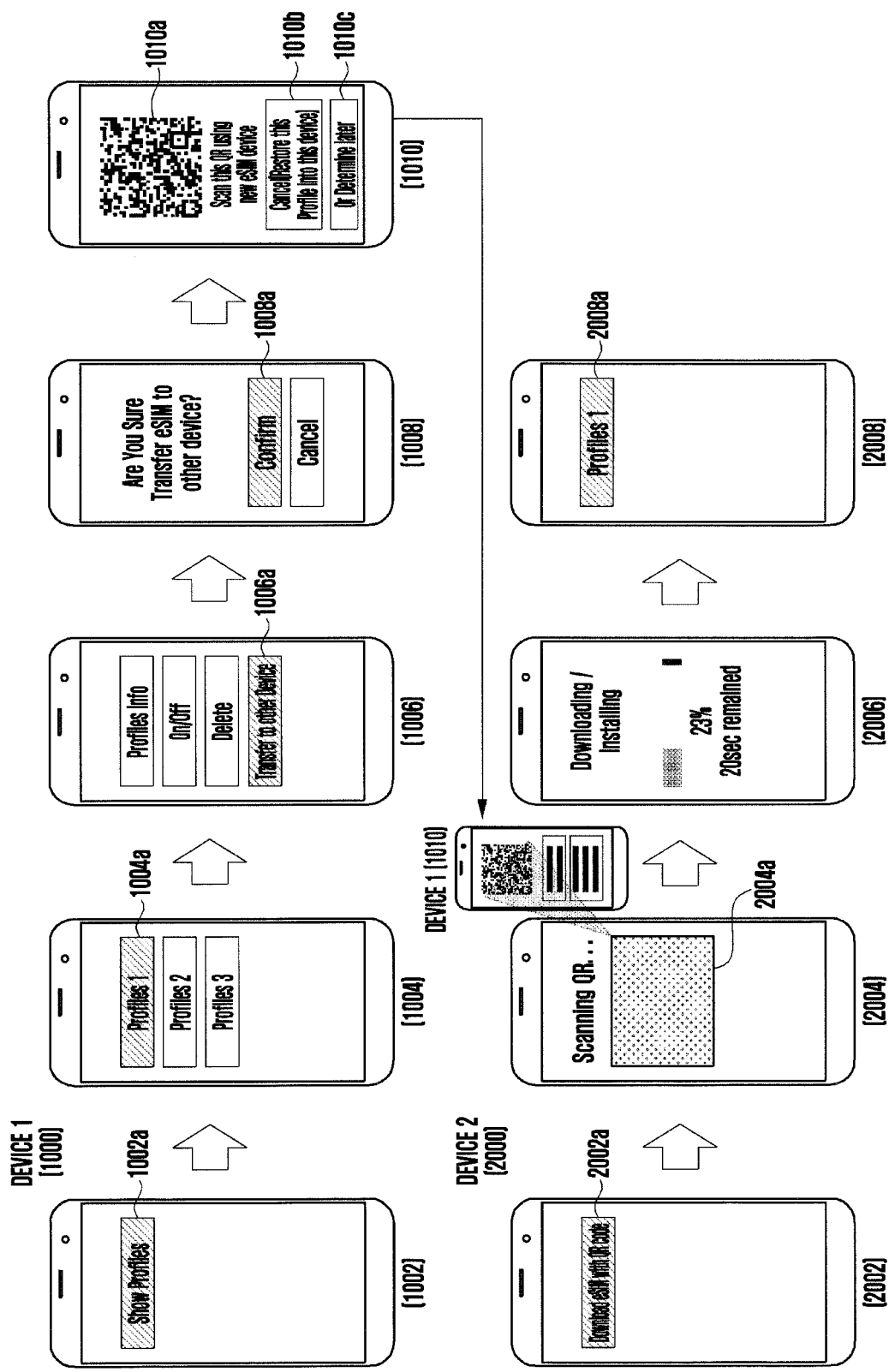
FIG. 1D illustrates an example of a device UI operation in a process of transferring access information from device 1 to device 2 according to an embodiment of the disclosure.

FIG. 1D illustrates an example of a device UI operation in a process of transferring access information from device 1 to device 2 according to an embodiment of the disclosure.

Referring to FIG. 1D, device 1 1000 may display a menu showing a profile to a user (1002). When the user selects the menu 1002a, device 1 1000 may display a profile list (1004). When the user selects one profile 1004a on the profile list, device 1 1000 may display information on profile 1 and a local management functions of the profile (1006). The function may include profile activation, profile deactivation, profile deletion, and profile transfer 1006a to a different device. When the user selects the transfer 1006a to the different device (receiving an input to transfer the profile), device 1 1000 may ask the user whether the user really wants the transfer and may provide a confirm menu 1008a (1008). When the user selects the confirm menu 1008a, device 1 1000 may delete the profile and may then display data including at least one of a profile server address, processing sequence information, ICCID information on the deleted profile, an indicator indicating that the profile has been deleted, or signature value information of an eUICC about information including these data in the format of a QR code and may also display a cancel/restore menu 1010b and a determine later menu 1010c. Information included in the QR code may be an activation code, which may be equally applied to the QR code mentioned in the following embodiments of the disclosure. A method for displaying the data is not limited to the format of the QR code, and the data may be displayed as barcode information, other encryption information, or the like. Hereinafter, although a description is made with reference to an example in which a QR code is used, embodiments of the disclosure are not limited thereto.

When the user selects the cancel/restore menu 1010b, device 1 1000 may download and install a profile again from a profile server using information 1010a displayed on the QR code or internally stored information corresponding thereto. When the user selects the determine later menu 1010c, device 1 1000 may internally store the information 1010a displayed on the QR code or the internally stored information corresponding thereto rather than deleting the same and may provide the information subsequently to determine whether to resume transferring the profile or to restore the profile back to device 1 1000 using the information.

Subsequently, a profile installation procedure of device 2 2000 is as follows. First, device 2 2000 may provide a SIM profile download menu 2002a with a QR code (2002). The QR code may be replaced with barcode information, other encryption information, or the like. When the user selects the menu 2002a and device 2 2000 starts scanning the QR code, the QR code 1010a of device 1 1000 may be scanned using device 2 2000. Subsequently, device 2 2000 may access the profile server address included in the QR code, may transmit a request message including the profile server address, the processing sequence information, the ICCID information on the deleted profile, the indicator indicating that the profile has been deleted, and the signature value information of the eUICC about the information including these data, may receive the profile, and may install the profile (2006). After the profile is completely installed, device 2 2000 may display the installed profile (2008).

Before or after device 1 1000 displays the profile transfer menu 1006a, device 1 1000 may identify whether the profile transfer of the profile is possible and may display an appropriate guide message. For example, device 1 1000 may identify whether the profile transfer is possible before displaying the menu and may then display the transfer menu 1006a only when the profile transfer is possible. Alternatively, device 1 1000 may display the transfer menu even though the profile transfer is impossible or restricted, and may then display a guide message indicating that the profile transfer is impossible or has a restriction when the user selects the transfer menu. Further, in operation 1010, device 1 1000 may obtain information on device 2 2000 before deleting the profile, may ask the profile server whether the profile transfer to device 2 2000 is possible, and may then delete the profile and display the QR code 1010a when the transfer is possible according to a query result. Although the foregoing embodiment is not limited to the scope of the description, some thereof will be described with reference additional drawings and embodiments.

Figure 2:
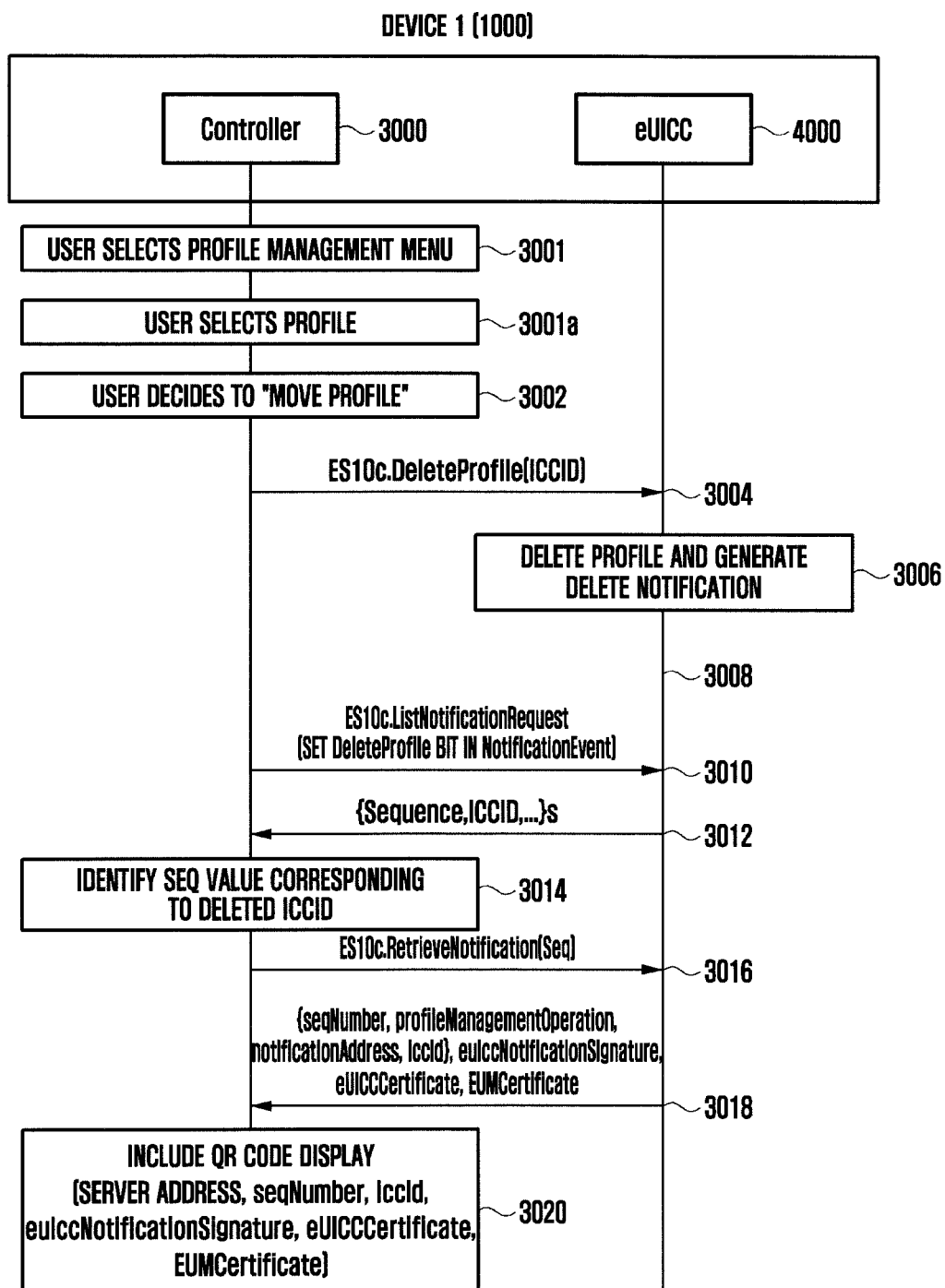
FIG. 2 illustrates an internal operation of device 1 according to an embodiment of the disclosure.

FIG. 2 illustrates an internal operation of device 1 according to an embodiment of the disclosure.

Referring to FIG. 2, device 1 1000 is a device having an eUICC 4000 installed therein and includes a controller 3000 capable of exchanging an eUICC control message with the eUICC 4000. The controller 3000 collectively refer to as hardware (HW) and software (SW) that control the eUICC 4000 in conjunction with the eUICC 4000 except for the eUICC 4000 in device 1 1000 and may be HW, such as an application processor (AP), a central processor (CP), or a baseband, or may be SW, such as an LPA. The controller 3000 may include at least one processor and may control the overall operation of device 1 1000. In an embodiment of the disclosure, device 1 1000 may further include a transceiver to communicate with a server, a base station, or other terminals. The configuration of device 1 1000 may be applied to other embodiments of the disclosure.

The configuration of device 1 1000 may be applied to the configuration of device 2 in addition to device 1. That is, device 2 may also include an eUICC and a controller and may further include a transceiver to communicate with the server, the base station, and other terminals. The configuration of device 2 may be applied to other embodiments of the disclosure.

Since a process of operation 3001, operation 3001a, and operation 3002 of FIG. 2 is equivalent or similar to a process of operation 1002, operation 1004, operation 1006, and operation 1008 of FIG. 1D, a detailed description thereof is omitted and the description of FIG. 1D refers thereto.

Subsequently, device 1 1000 may transmit a first control message (e.g., an ES10c.DeleteProfile message) including an ID (ICCID) of a selected profile to the eUICC 4000 (3004). The eUICC 4000 may delete the profile and may generate Delete Notification information (3006). The Delete Notification information may include the information included in the QR code 1010a in FIG. 1D. That is, the QR code 1010a may be configured using all or part of the Delete Notification information. After deleting the profile, the eUICC 4000 may transmit a result message to the controller 3000 (3008).

Operation 3010 to operation 3018 correspond to an example of a process in which the controller 3000 obtains data for verifying that the profile specified by the value of the ICCID has been deleted from the eUICC 4000.

The process of obtaining this data does not need to be performed in exactly the same order as that of operation 3010 to operation 3018 in the drawing, and may be performed by obtaining a large number of pieces of data from the eUICC 4000 and extracting a Delete Notification for the ICCID therefrom. Operation 3010 to operation 3018 are described as follows.

The controller 3000 sets a DeleteProfile bit in event information (NotificationEvent) data to be received in a second control message (e.g., an ES10c.ListNotificationRequest message) and transmits the second control message to the eUICC 4000 (3010). Upon receiving the second message, the eUCICC 4000 transmits all notification information corresponding to DeleteProfile to the controller 3000. A corresponding notification includes at least one of processing sequence information (indicated by Sequence, Seq, or seqNumber) and profile ID (or iccid or ICCID) (3012).

The controller 3000 may select a notification or a Seq value corresponding to the profile deleted in operation 3006 (3014) and may transmit a third control message (e.g., an ES10c.RetrieveNotification message) including the Seq value to the eUICC 4000 (3016). The eUICC 4000 may transmit notification information corresponding to the Seq value among pieces of stored notification information to the controller 3000 (3018). Information included in the notification information may include at least one of the following pieces of information.

- seqNumber: Processing sequence number information (3018a)
- profileManagementOperation: Identifier for identifying whether the profile has been deleted (3018b)
- notificationAddress: Profile server address (3018c)
- iccid: ID of deleted profile (3018d)
- euiccNotificationSignature: Digital signature (3018e) of eUICC 4000 used to verify that the profile is the ICCID, to verify that the processed operation is an indicator indicating deletion, and to verify that the processing sequence information is the SEQ value
- eUICCCertificate: eUICC certificate used to verify the validity of the eUICC signature (30180
- EUMCertificate: Additional certificate used to identify the validity of the eUICC certificate (3018g)

Subsequently, device 1 1000 may configure the information including the at least one of the above information in the form of an activation code, may encode the activation code into a QR code 1010a, and may display the QR code through a display of device 1 (3020).

The information included in the QR code is information to be transmitted to device 2. According to an embodiment of the disclosure, device 2 2000 transmits part or all of the information obtained through the QR code finally to a profile server.

Among the above data, the eUICC certificate is data for verifying that the eUICC signature is valid, and does not necessarily need to be transmitted through device 2, and the EUM certificate is a certificate for verifying that the eUICC certificate is a valid certificate, and does not necessarily need to be transmitted through device 2.

In this case, all or part of the eUICC certificate or the additional certificate may be transmitted to the profile server using a different method rather than being included in the QR code.

For example, device 1 may transmit the eUICC certificate or the additional certificate to the profile server through a profile download process or may separately transmit the eUICC certificate or the additional certificate to the profile server through a profile activation/deactivation notification message or a different message. In another example, device 1 1000 may first store the eUICC certificate and the EUM certificate of device 1 1000 in a process of making a subscription transfer request to the profile server before transmitting activation code information to device 2 and may then transmit the activation code to device 2 excluding the eUICC certificate and the EUM certificate among the foregoing pieces of notification information. The profile server may store the eUICC certificate and the EUM certificate received in advance and may use the same for signature verification of the activation code information transmitted by device 2 to the profile server. An operation of device 1 1000 as to whether to include the eUICC certificate and the EUM certificate in information transmitted from device 1 1000 to device 2 or not may be a fixed operation or may be changed depending on the situation. For example, there may be a plurality of methods as follows.

1) Operation of the LPA or the eUICC including or excluding the certificate according to information (e.g., version information on the server or indicator information included in a response to the subscription transfer request) provided by the profile server.

2) Operation of including or not including the certificate according to the setting value of the device (e.g., version information on the eUICC).

3) Operation of the eUICC or the LPA including or not including the certificate according to information of the setting value of the profile (e.g., profile metadata) of device 1.

When the LPA performs the operation of excluding the certificate among the above methods 1) to 3), the LPA may exclude the eUICC certificate and the EUM certificate from notification data transmitted by the eUICC, may modify a data length value, and may then encode the data in the form of an activation code.

Further, in operation 3020, instead of displaying the information as the QR code, it is possible to transmit the information to device 2 via short-range communication, such as NFC, Bluetooth, and UWB, Wi-Fi communication, or a server.

However, when device 1 displays the information as the QR code (1010a), device 2 can install the profile of device 1 through a general eSIM profile download process of scanning the QR code, thus enabling a device transfer operation without modifying an existing profile download process.

An example of the configuration of data to be displayed as the QR code (1010a) is illustrated below.

LPA: x$SMDP.TEST.COM$XXXXX

In this example, SMDP.TEST.COM denotes the address of the illustrated profile server, $ denotes an identifier for identifying each piece of information, LPA: denotes that this data is an activation code format used for profile downloading, x denotes the type of the activation code and may have, for example, a value of 1, 2, 3, or 4, and XXXXX denotes data in an ACToken area and may be information obtained by encoding information including part or all of ASN.1 data illustrated below, which is indicated by XXXXX for convenience.

ASN.1 Data
OtherSignedNotification::=SEQUENCE {
tbsOtherNotification NotificationMetadata,
euiccNotificationSignature [APPLICATION 55] OCTET STRING,—eUICC signature of tbsOtherNotification, Tag '5F37'
euiccCertificate Certificate,—eUICC Certificate (CERT.EUICC.ECDSA) signed by the EUM
eumCertificate Certificate—EUM Certificate (CERT.EUM.ECDSA) signed by the requested CI}
NotificationMetadata::=[47] SEQUENCE {—Tag 'BF2F'
seqNumber [0] INTEGER,
profileManagementOperation [1] NotificationEvent, /*Only one bit SHALL be set to 1*/
notificationAddress UTF8String,—FQDN to forward the notification
iccid OPTIONAL}

Here, the encoding may be 1) a method for expressing the data in the ASN.1 format as characters by performing DER encoding and then hexadecimal encoding or 2) a method for expressing the data in the ASN.1 format as characters by performing DER encoding and then BASE64 encoding.

Further, a process in which device 1 1000 generates the activation code may include some or all of the following operations.

1. Operation in which the LPA of device 1 1000 deletes the profile by transmitting a message to the eUICC, for example, operation in which the LPA of device 1 deletes the profile by transmitting an ES10c.DeleteProfile message to the eUICC using the profile ID or ICCID of the profile to be deleted 2. Operation in which the LPA of device 1 1000 obtains at least one of a PendingNotification TLV or a OtherSignedNotification TLV by transmitting an Es10b.RetrieveNotificationList message to the Euicc 3. Operation of separately obtaining DeleteNotification for the ICCID among one or more of a PendingNotification TLV or an OtherSignedNotification TLV using notificationMetadata information. For example, the notificationMetadata information may include at least one of an ICCID or NotificationEvent 4. The PendingNotification TLV or OtherSignedNotification TLV may be ASN.1 DER-encoded byte stream data when transmitted from the eUICC to the LPA. Operation of expressing each 1-byte data as each 2-digit character string considering this hexadecimal byte stream data as characters from 0 to 9 and A to F (e.g., operation of expressing 9-byte byte stream data, such as "0x01 0x23 0x45 0x67 0x89 0xAB 0xCD 0xEF 0x00" expressed in a hexadecimal number, as an 18-digit character string, such as "0123456789ABCDEF")

5. Operation of including the character string in AC_Token in the form of the activation code 6. Operation of encoding the activation code into a QR code image Although not shown in the drawing, before deleting the profile to transfer the profile from device 1 1000, device 1 1000 may obtain device information (e.g., eUICCInfo or DeviceInfo) about device 2, may transmit the device information to the profile server to check whether it is possible to reinstall the profile in device 2, and may then perform a subsequent process.

Figure 3:
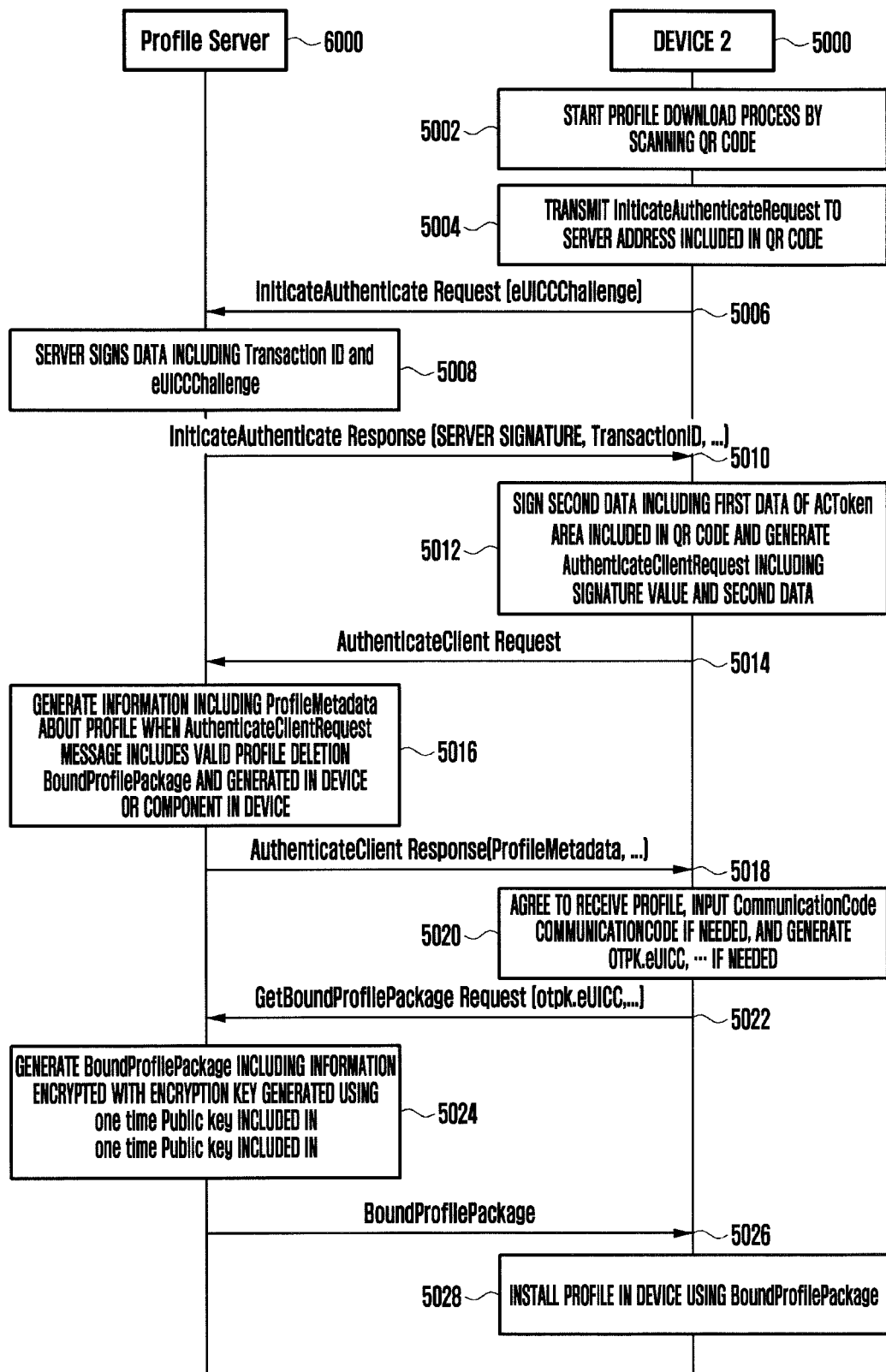
FIG. 3 illustrates the operations of device 2 2000 and a profile server 6000 according to an embodiment of the disclosure.

FIG. 3 illustrates the operations of device 2 2000 and a profile server 6000 according to an embodiment of the disclosure.

Referring to FIG. 3, device 2 2000 may start a profile download process by scanning the QR code displayed on device 1 1000 in operation 3020 illustrated in FIG. 2 (5002). Device 2 2000 may transmit an InitiateAuthenticate message 5006 to the profile server 6000 corresponding to a profile server address included in the QR code 1010a (5004). Here, the InitiateAuthenticate message may include eUICCChallenge. When receiving the InitiateAuthenticate message 5006, the profile server 6000 may generate a transaction ID, may generate a signature of the profile server for data including eUICCChallenge and the transaction ID (5008), and may transmit a response to device 2 2000 (5010). Here, the transmitted InitiateAuthenticate response message may include a profile signature value and the transaction ID (5010). After receiving the InitiateAuthenticate response message, device 2 2000 may generate data including an ICCID and eUICC signature data of device 1 included in the QR code and device 2 eUICC signature data obtained by an eUICC of device 2 2000 signing the data (5012) and may transmit an AuthenticateClientRequest message including the pieces of data to the profile server 6000 (5014).

When receiving the AuthenticateClientRequest message, the profile server 6000 performs a validity verification process including verification of the ICCID, the signature data of the eUICC of device 1, and the signature data of the eUICC of device 2 included in the AuthenticateClientRequest message, may determine whether to download the profile, and may transmit an AuthenticateClientResponse message including data including ProfileMetadata corresponding to the profile (5018). Verification of the signature data of the eUICC of device 1 may be signature verification using a certificate 3018f of the eUICC 4000 of device 1 2000 for data including the ICCID and data including additional data, that is, data including 3018a, 3018b, 3018c, and 3018d.

The signature verification may be elliptic curve digital signature authentication (ECDSA). The eUICC certificate 3018f may be authenticated as the EUM certificate 3018g as described above. The EUM certificate 3018g may be verified as a certificate authority (CA) certificate included in the profile server. The CA certificate may also be referred to as a certificate issuer (CI) certificate. The validity verification process 5016 may include a process of identifying an eUICC finally installed with respect to the ICCID as the eUICC of device 1 and a process of identifying the validity of a message using the seq number 3018a. Further, although not shown in the drawing, the validity verification process of the profile server 6000 may also include a process in which the profile server 6000 asks an operator server whether reinstallation of the profile of the ICCID is allowed and receives a query result as described in FIG. 1B.

Specifically, the process of the profile server verifying the signature data of device 1 may include some or all of the following operations.

1. Operation of the profile server obtaining information (e.g., CtxParamsForCommonAuthentication TLV) included in the AuthenticateClient Request message received from device 2 (here, the operation of obtaining a CtxParams- ForCommonAuthentication TLV may include an operation of obtaining ASN.1 DER-encoded byte stream data by performing Base64 decoding on the AuthenticateClient Request message)

2. Operation of extracting a matchingId TLV from a CtxParamsForCommonAuthentication TLV 3. Operation of obtaining a character string corresponding to AC_Token by performing UTF8 decoding in the matchingID TLV 4. Operation of converting the AC_Token character string into byte stream data of an ASN.1 DER-encoded PendingNotification TLV or OtherSignedNotification TLV by matching each 2-digit character string with each 1-byte data (e.g., operation of converting a 18-digit character string, such as "0123456789ABCEDF00", into 9-byte byte stream data, such as "0x01 0x23 0x45 0x67 0x89 0xAB 0xCD 0xEF 0x00", expressed in a hexadecimal number 5. Operation of extracting signature information (e.g., ASN.1 DER-encoded byte stream data of a euiccNotificationSignature TLV) from the ASN.1 DER-encoded byte stream data of the PendingNotification TLV or OtherSignedNotification TLV 6. Operation of verifying the signature of device 1 using the euiccNotificationSignature byte stream data and other data Subsequently, device 2 2000 may receive the AuthenticateClientResponse message (5018), and when the AuthenticateClienteResponse message includes ProfileMetadata, device 2 2000 may perform some or all of a process of agreeing to receive the profile through a UI displayed to a user, a process of requesting input of a confirmation code and receiving the confirmation code, and a process of generating a one-time public key (otpk.eUICC) of the eUICC (5020).

When device 2 2000 transmits a GetBoundProfilePackage request including the otpk.eUICC to the profile server 6000 (5022), the profile server 6000 may generate BoundProfilePackage including information encrypted with an encryption key generated using the otpk.eUICC (5024) and may transmit BoundProfilePackage to device 2 2000 (5026). When receiving BoundProfilePackage (5026), device 2 2000 may install the profile in the eUICC of device 2 2000 (5028).

Figure 4:
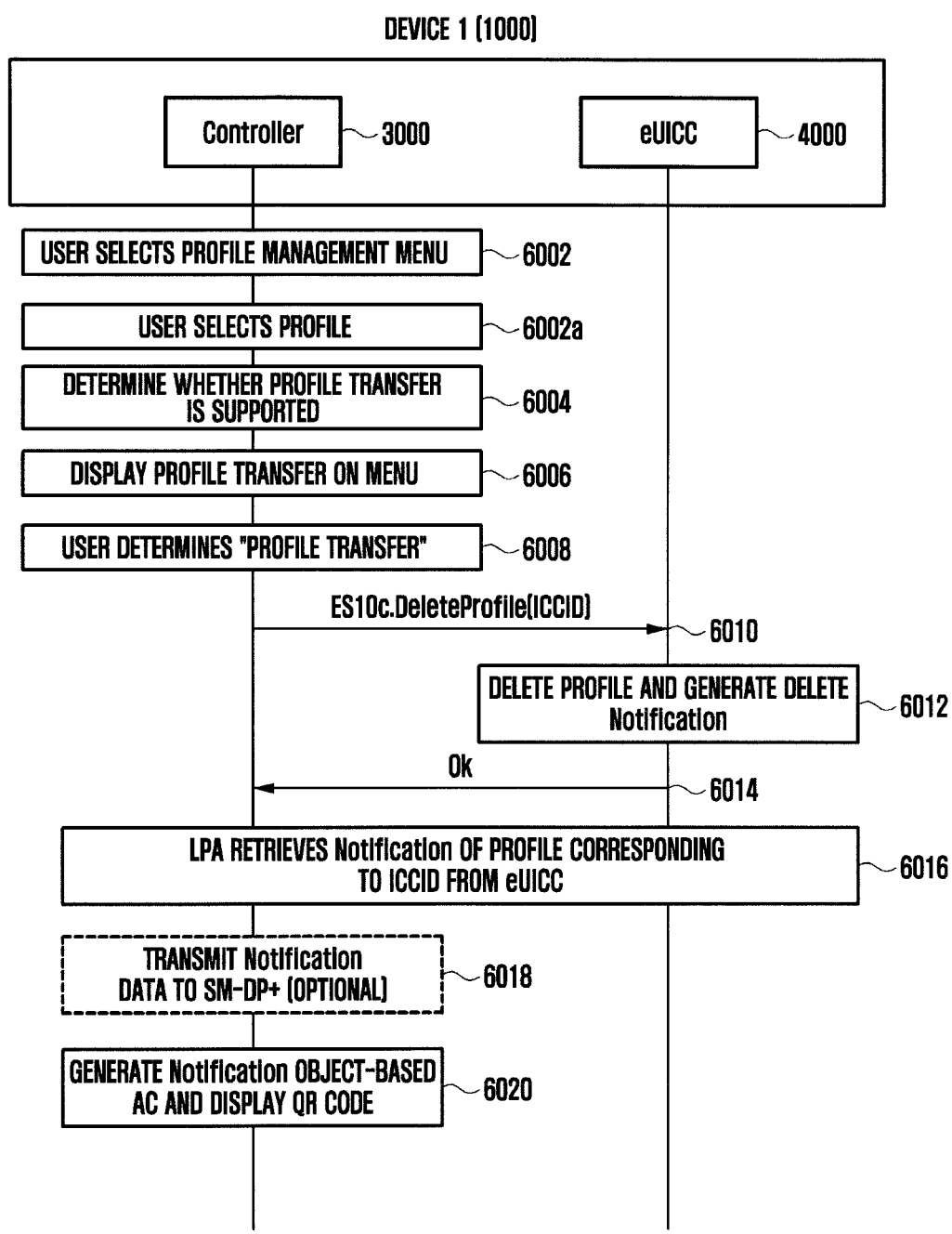
FIG. 4 illustrates an internal operation of device 1 according to an embodiment of the disclosure.

FIG. 4 illustrates an internal operation of device 1 according to an embodiment of the disclosure.

Referring to FIG. 4, device 1 1000 is a device having an eUICC 4000 installed therein and includes a controller 3000 capable of exchanging an eUICC control message with the eUICC 4000. The controller 3000 collectively refers to HW and SW that control the eUICC 4000 in conjunction with the eUICC 4000 except for the eUICC 4000 in device 1 1000 and may be HW, such as an AP, a CP, or a baseband, or may be SW, such as an LPA.

Since a process of operation 6002 and operation 6002*a* of FIG. 4 is equivalent or similar to a process of operation 1002 to operation 1004 of FIG. 1D, the description of FIG. 1D refers thereto.

Referring to operation 6004, when a user selects a specific profile on a screen of device 1 1000, device 1 1000 may determine whether the profile 6004*a* supports a profile transfer function (6004).

The determination may be performed by the following methods.

1) Determining by asking a profile server
2) Determining by asking a different server other than a profile server, for example, a check server
3) Determining using information stored in a device These methods are further described as follows.

1) A process in which the device determines whether the specific profile supports a profile transfer by asking the profile server may include a process in which the device transmits a query request message including at least one piece of data among an ICCID, a SEQ, a ProfileManagementOperation type identifier, an eUICC signature, an eUICC certificate, an eUICC EUM certificate, or a Sub CA certificate when asking the server. The ProfileManagementOperation type identifier may include information indicating enabling, disabling, or deletion of the profile.

In the process in which the device determines whether the specific profile supports the profile transfer by asking the profile server, after the device asks the profile server, the profile server may transmit a response message including whether the server supports a function of the profile transfer of the specific profile and additional information to the device in response. The additional information may include at least one piece of data among additional information on a payment requirement relating to the profile transfer of the specific profile, the number of remaining possible transfers relating to the profile transfer of the specific profile, or constraint information indicating that there is a restriction of allowing the profile to be installed only on a specific device.

2) A process in which the device determines whether the specific profile supports the profile transfer by asking the check server may include a process in which the device transmits a query request message including at least one piece of data among an ICCID, operator information, a profile server address, or a profile server ID to the server when asking the server.

The process in which the device determines whether the specific profile supports the profile transfer by asking the different server may include a process in which the server may transmit a response message including at least one piece of data including transfer information on whether a profile transfer per ICCID is supported and profile server information to the device in response after the device asks the server.

3) A process in which the device determines whether the specific profile supports the profile transfer using the information stored in the device may be a method in which the device uses profile transfer support information, stored while installing the profile, for transferring the profile.

In the embodiment of the disclosure, it is possible to select a profile transfer menu (6006/6008) after operation 6004. However, in another embodiment, after the profile transfer menu is displayed first and a user selects or confirms a profile transfer, it may be determined whether the profile transfer is possible (6004), operation 6010 to be described below may be performed when the transfer is possible, and it may be indicated to the user that the profile transfer is not supported through a UI of device 1 1000 when the profile transfer is not possible in operation 6004. Here, in the foregoing various processes of determining whether the profile transfer function is supported, a guide message using the information obtained by device 1 1000 from the profile server or the check server or information stored in device 1 1000 may also be displayed through the UI of device 1 1000.

In still another embodiment, when the user does not enter a profile management menu but the device has previously confirmed whether the profile transfer is supported for each Profile, the profile transfer may be displayed in 6006 only when the profile transfer is supported using corresponding information.

Subsequently, device 1 1000 may transmit an ES10c.DeleteProfile message including the ID (ICCID) of the selected profile to the eUICC (6010). The eUICC 4000 may delete the profile and may generate information of a delete notification (6012). The information of the delete notification may include the information included in the QR code in FIG. 1D. That is, the QR code may be configured using all or part of the information of the delete notification. The eUICC 4000 may transmit a result message to the controller 3000 after deleting the profile (6014).

Operation 6016 is a process in which the controller 3000 obtains data for verifying that the profile specified by the ICCID value has been deleted from the eUICC 4000, and the data may be notification data generated by the eUICC 4000 in operation 6012. In one example of operation 6016, operation 3010 to operation 3018 of FIG. 2 may be entirely or partly applied.

In operation 6018, device 1 1000 may additionally transmit the notification to the profile server. Using operation 6018, all or part of a certificate of the eUICC of device 1 1000 or a higher certificate of the certificate of the eUICC may be directly transmitted to the server through device 1 1000 rather than device 2.

Device 1 1000 may encode information including the information into a QR code and may display the QR code (6020).

An encoding method and included data of the QR code may be the same as or similar to those described in FIG. 1D and FIG. 2, and thus a description thereof will be omitted.

In operation 6020, instead of displaying the information as the QR code, it is possible to transmit the information to device 2 through short-range communication, such as NFC, Bluetooth, and UWB, or Wi-Fi communication or via the check server, which may be applied to all embodiments of the disclosure.

Figure 5:
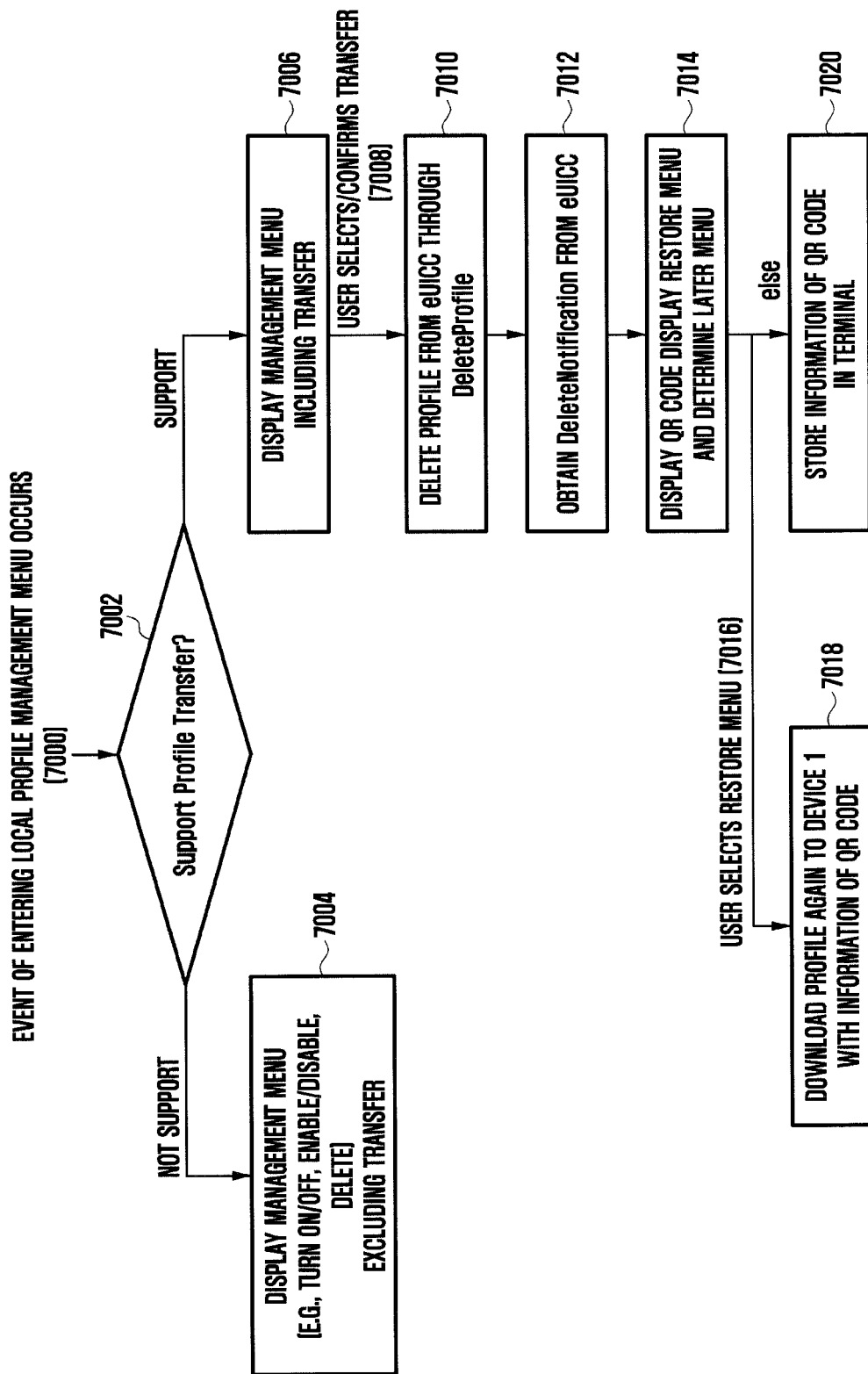
FIG. 5 illustrates an internal operation of device 1 according to an embodiment of the disclosure.

FIG. 5 illustrates an internal operation of device 1 according to an embodiment of the disclosure.

A process of operation 7000 to operation 7014 of FIG. 5 is the same as or similar to a process of operation 6002a to operation 6020 of FIG. 4, and thus a description thereof will be omitted. Further, a process of operation 7016, operation 7018, and operation 7020 of FIG. 5 may correspond to an operation in a case where a user selects the cancel/restore menu in FIG. 1D and an operation in a case where the user selects the determine later menu. A detailed description of these operations corresponds to the description of the embodiment according to FIG. 1D.

Figure 6:
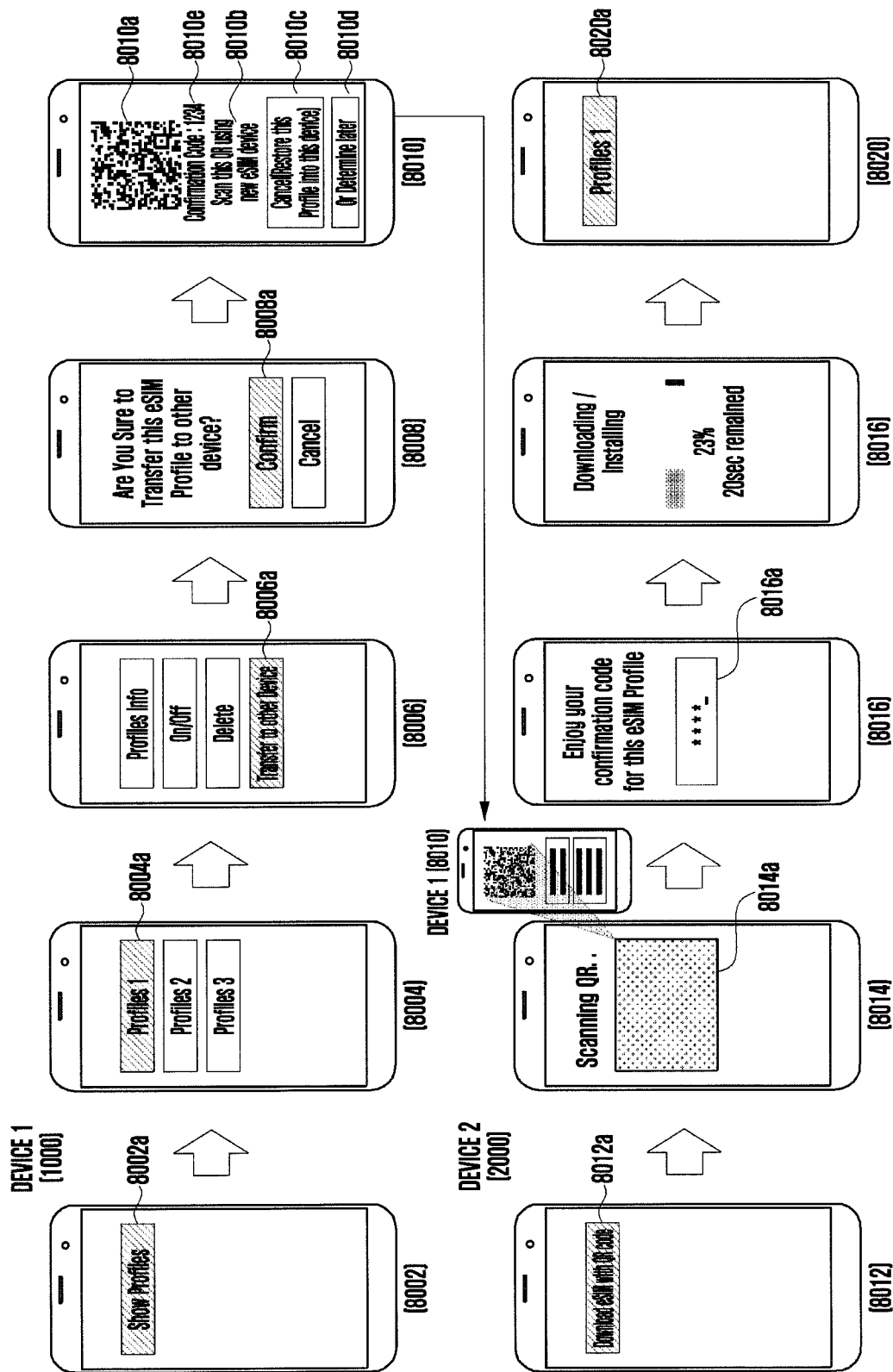
FIG. 6 illustrates a process of transferring access information from device 1 to device 2 according to an embodiment of the disclosure.

FIG. 6 illustrates a process of transferring access information from device 1 to device 2 according to an embodiment of the disclosure.

Referring to FIG. 6, operation 8002 to operation 8008 are the same as or similar to operation 1002 to operation 1008 of FIG. 1D, and thus a related description thereof corresponds to that of FIG. 1D. Referring to operation 8010 of FIG. 6, when displaying a QR code 8010a, device 1 1000 may display information of a confirmation code (CC) 8010e. The confirmation code 8010e may be information that device 1 1000 internally stores and then displays when the confirmation code is required when a profile 8004a as a profile transfer target is installed. A method of internally storing the confirmation code may be a method of storing the confirmation code in a controller or an eUICC of device 1 1000 while installing the profile. A subsequent process is similar to the operation of FIG. 1D, but an operation of requesting a user to input the confirmation code (8016) is added after device 2 2000 scans the QR code of device 1 1000 (8014). Here, the user may input the displayed confirmation code 8010e to device 1 1000. Accordingly, it is possible to easily provide a profile transfer without identifying the separately stored confirmation code.

In another embodiment, device 1 1000 may display a guide message indicating that the confirmation code is required instead of displaying the confirmation code in operation 8010. Further, device 1 1000 may display the guide message indicating that the confirmation code is required to the user at a time before device 1 1000 deletes the profile. Accordingly, a guide message may be provided so that a user not storing the confirmation code does not perform a profile movement. Since operation 8018 and operation 8020 correspond to operation 2006 and operation 2008 of FIG. 1D, a description thereof is omitted.

Figure 7:
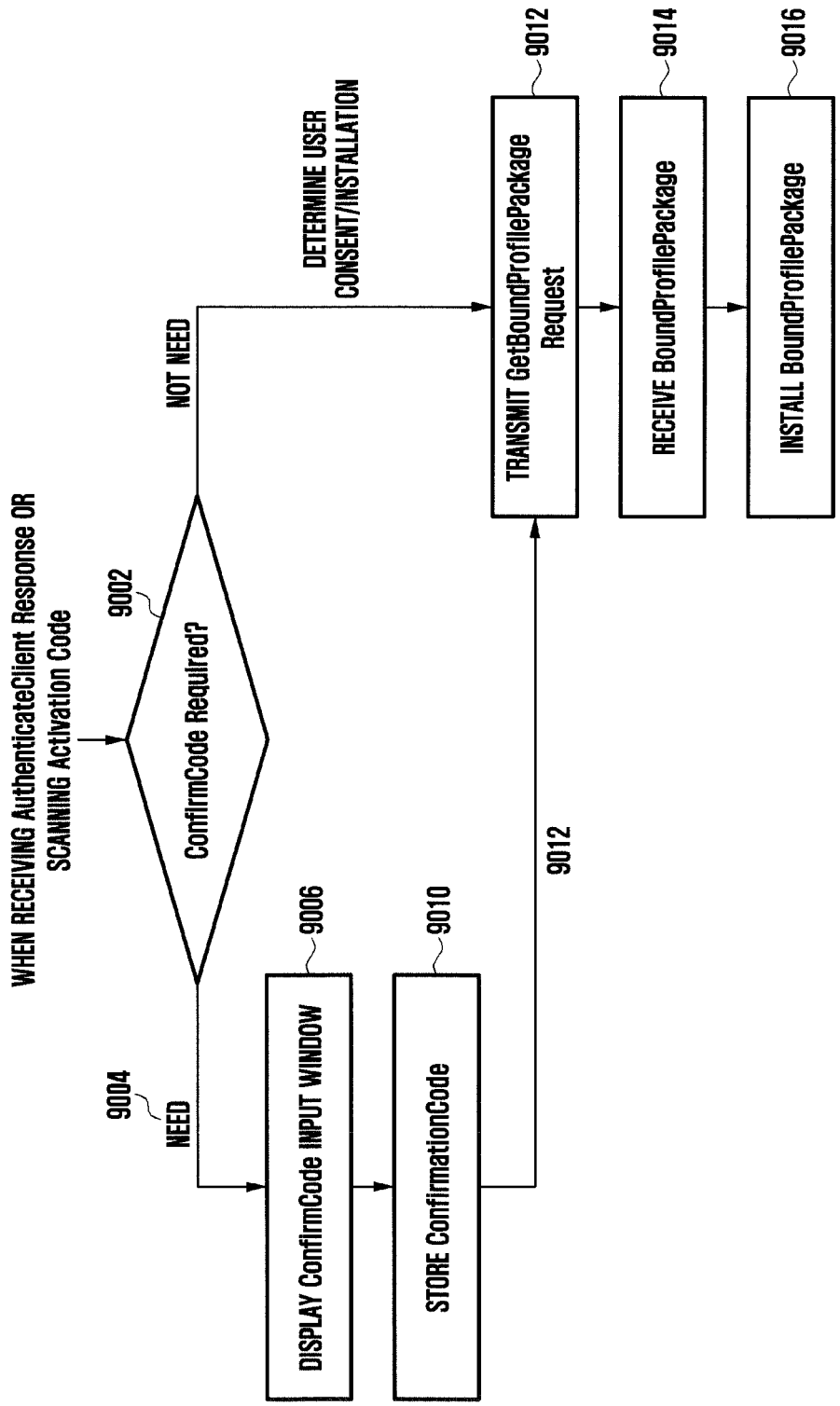
FIG. 7 illustrates the operation of device 1 before transferring a profile according to an embodiment of the disclosure.

FIG. 7 illustrates the operation of device 1 before transferring a profile according to an embodiment of the disclosure. The process of FIG. 7 may be a process that needs to be performed in advance to perform the process of FIG. 6.

Referring to FIG. 7, when receiving an Authentication-ClientResponse or scanning an activation code, device 1 may determine whether a confirmation code is required for profile downloading (9002). When the confirmation code is required (9004), device 1 may display a UI for inputting the confirmation code (9006). When a user inputs the confirmation code, device 1 may temporarily store the confirmation code (9010). Device 1 may transmit a GetBoundProfilePackage to a profile server, and when normally receiving a BoundProfilePackage (9014), device 1 may install the BoundProfilePackage (9016). When the temporarily stored confirmation code is determined to be maintained after determining whether to maintain or delete the temporarily stored value in operation 9014 or 9016, the temporarily stored confirmation code may be mapped to a profile and may be stored in a memory of device 1. In a process of storing the confirmation code in the memory in or after operation 9010, the confirmation code may be stored in a controller, an eUICC, a secure element, or HW equivalent thereto. Further, the confirmation code may be stored in association with the profile. That is, when an ICCID or a profile is specified subsequently, a corresponding confirmation code may be stored in association with the ICCID or the profile. When the confirmation code is not required and it is determined to install the profile according to user consent, operation 9012 and subsequent operation may be performed.

Figure 8:
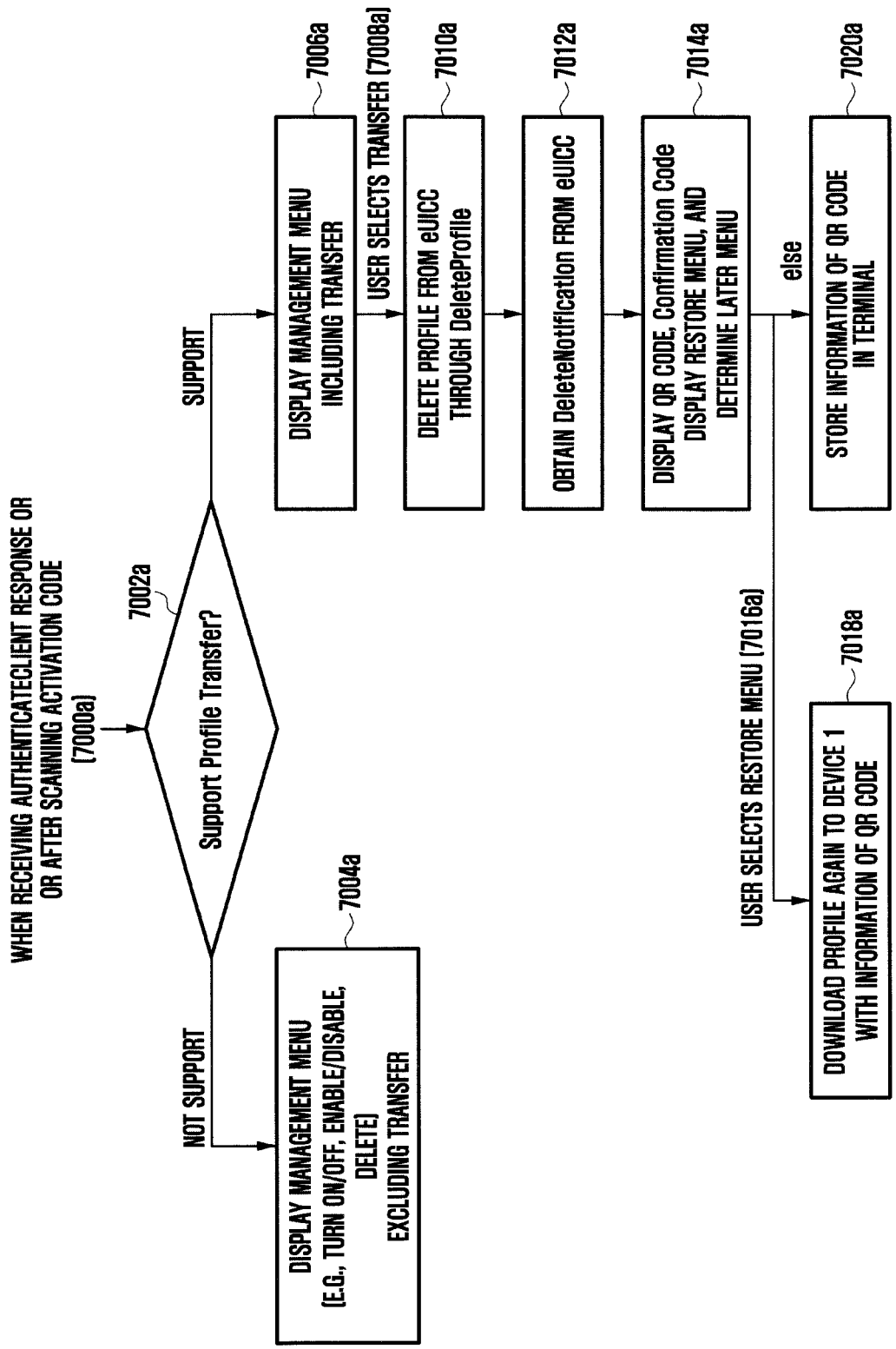
FIG. 8 illustrates an internal operation of device 1 according to an embodiment of the disclosure.

FIG. 8 illustrates an internal operation of device 1 according to an embodiment of the disclosure.

FIG. 8 is similar to the process of FIG. 5 but is different therefrom in that a confirmation code may be additionally displayed in operation 7014a. Other operations are similar to those of FIG. 5, the description of FIG. 5 refers thereto.

Figure 9:
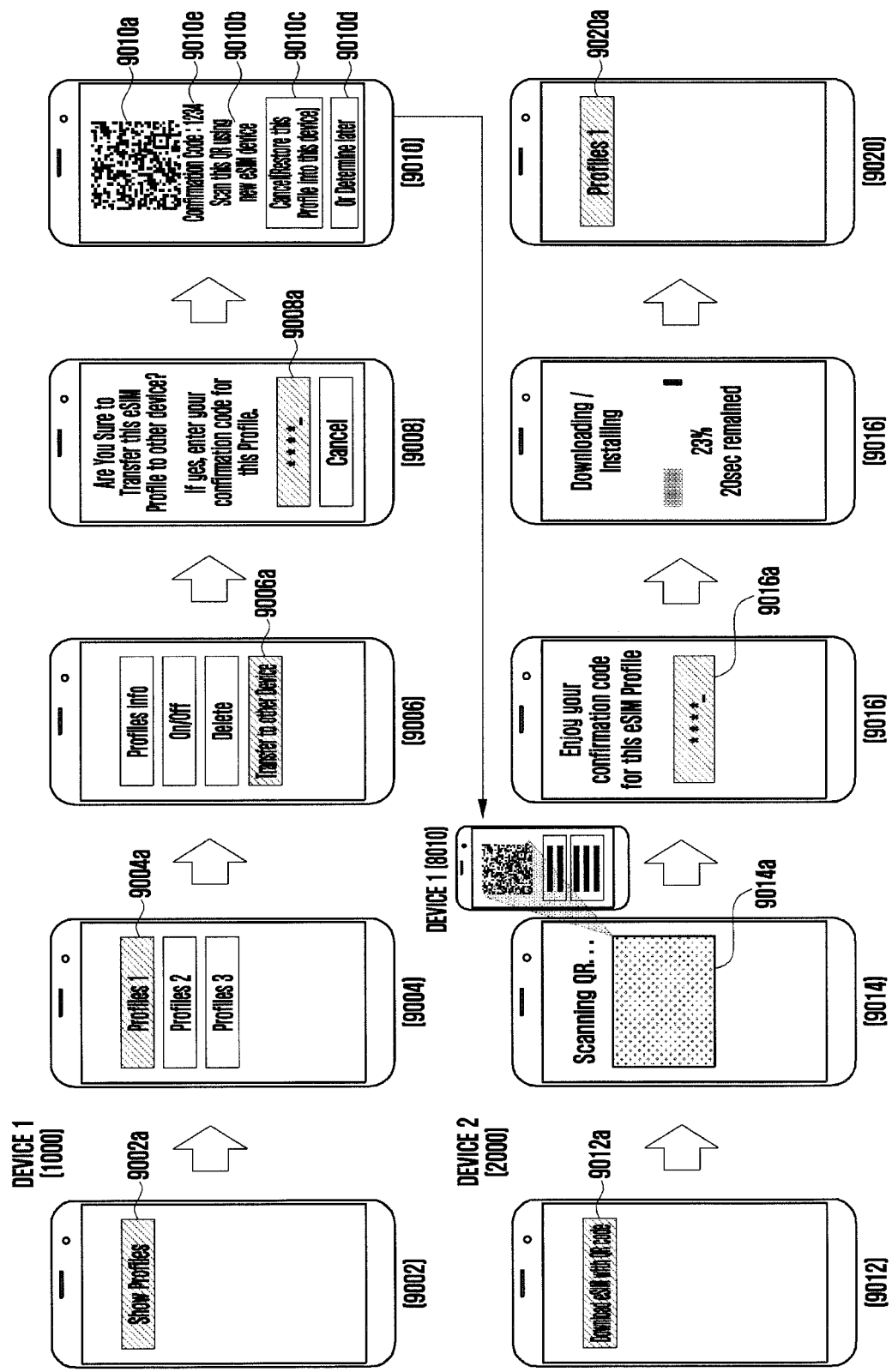
FIG. 9 illustrates a process of transferring access information from device 1 to device 2 according to an embodiment of the disclosure.

FIG. 9 illustrates a process of transferring access information from device 1 to device 2 according to an embodiment of the disclosure.

Since the process of FIG. 9 is the same as or similar to that of FIG. 6, an overall description is omitted and the description of FIG. 6 refers thereto. The process of FIG. 9 has an additional difference from that of FIG. 6 as follows. Referring to FIG. 9, when a user selects a profile transfer of a specific profile on device 1 1000, device 1 1000 may request the user to input a confirmation code (9008). The user may input the confirmation code used when installing the profile. Device 1 1000 may identify whether the confirmation code input by the user is the same as the confirmation code internally stored in operation 9006 to operation 9010, operation 9014, or operation 9016 of FIG. 7. Alternatively, it is possible to identify whether the value of an operation (e.g., a hash operation) of the confirmation code input by the user in operation 9006 to operation 9010 is the same as a hash value internally stored. When device 1 1000 determines that the confirmation code input by the user is valid through the foregoing various process of identifying whether the confirmation codes are the same, operation 9010 may be performed. A description of operation 9010 is the same as or similar to the description of FIG. 6 or 1D, and thus a further description is omitted.

Figure 10:
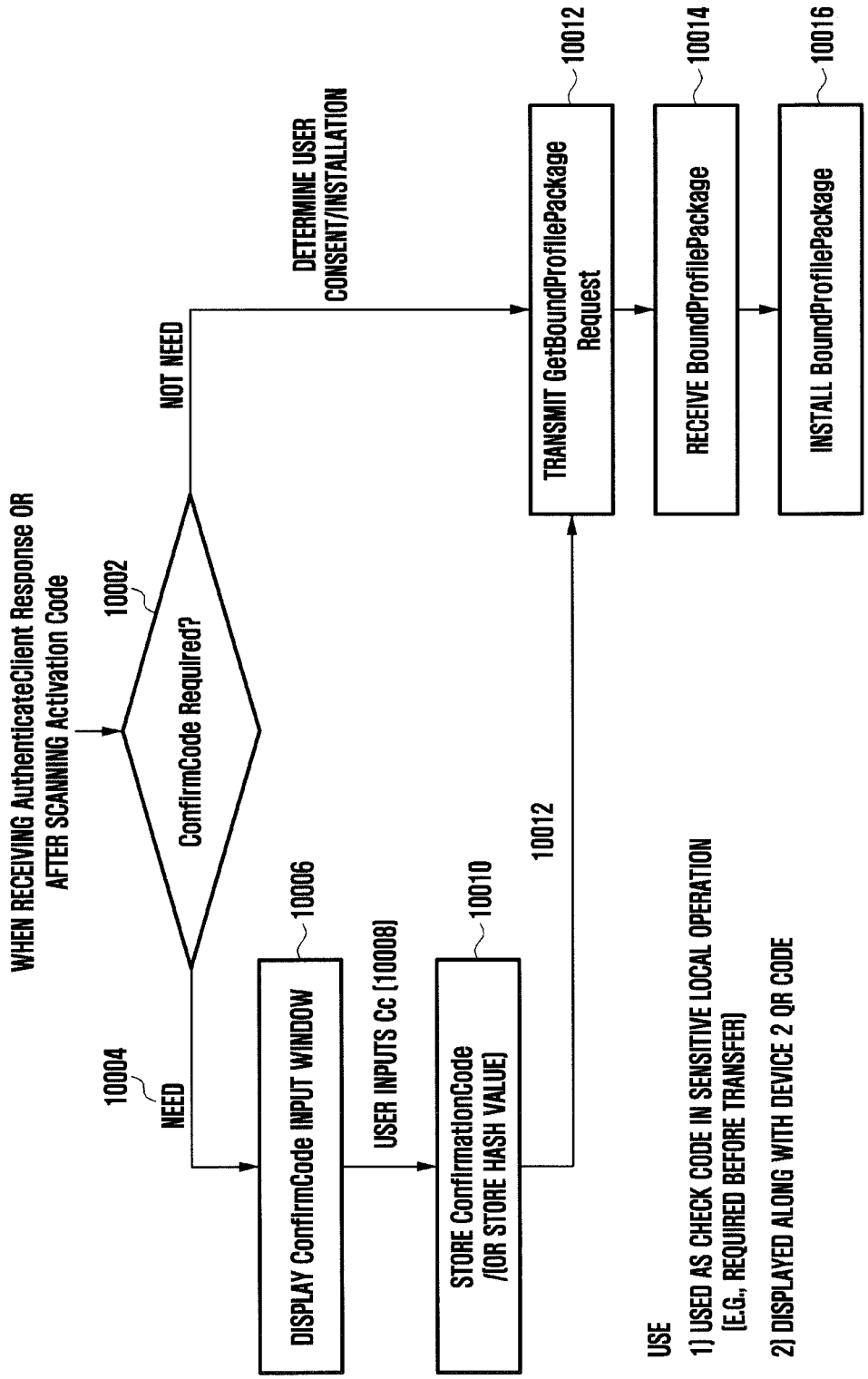
FIG. 10 illustrates the operation of device 1 before transferring a profile according to an embodiment of the disclosure.

FIG. 10 illustrates the operation of device 1 before transferring a profile according to an embodiment of the disclosure.

The operation of FIG. 10 is similar to that of FIG. 7. Therefore, a specific operation of FIG. 10 corresponds to the operation of FIG. 7. However, in FIG. 10, when storing a confirmation code in device 1, the confirmation code may be stored or the hash of the confirmation code may be stored (operation 10010). The hash value may be a SHA256 hash function.

Figure 11:
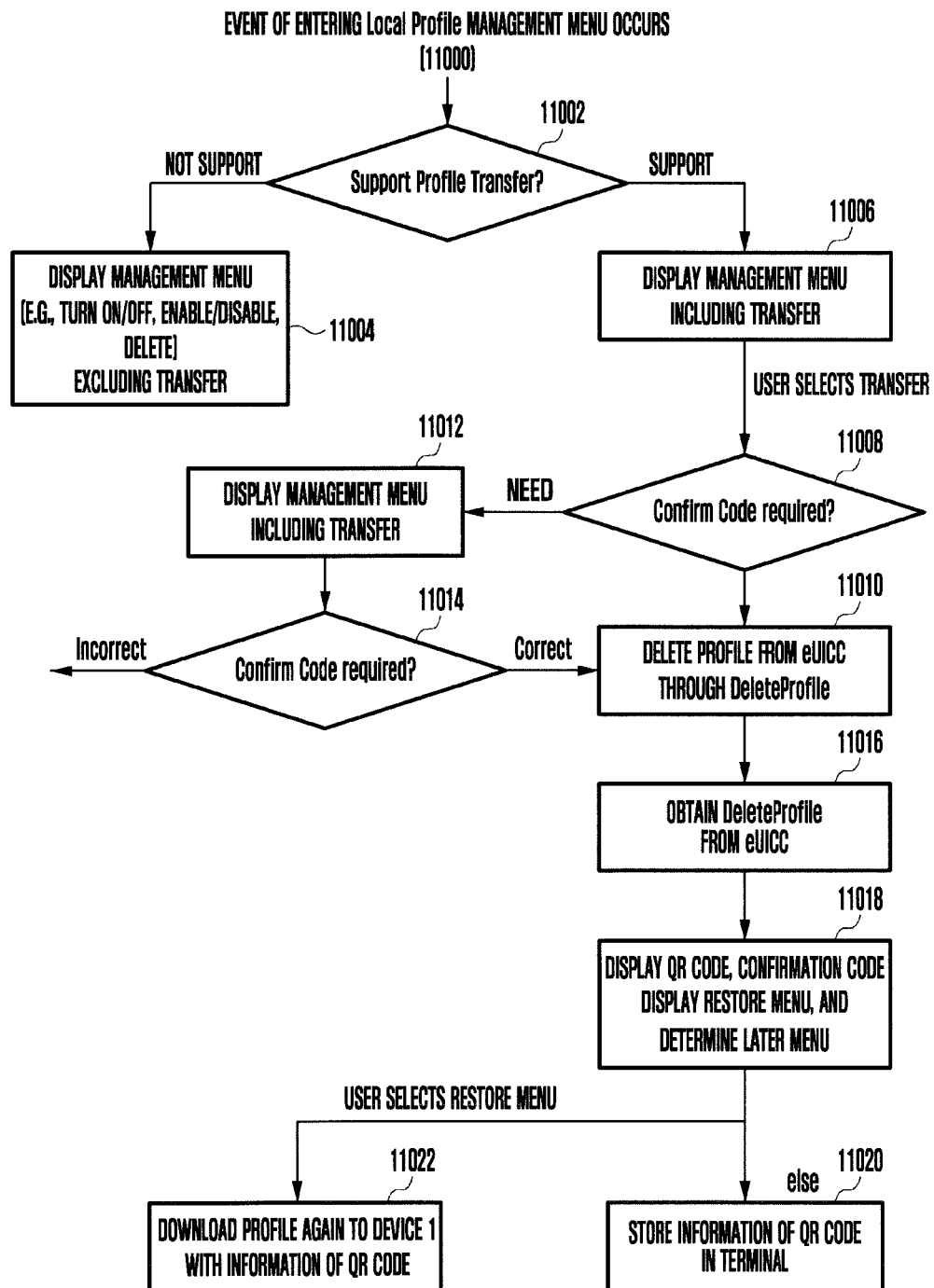
FIG. 11 illustrates the operation of device 1 according to an embodiment of the disclosure.

FIG. 11 illustrates the operation of device 1 according to an embodiment of the disclosure.

FIG. 11 shows a reconfiguration of the operation of device 1 of FIG. 9, and a detailed description thereof is similar to the description of FIG. 9 and the description of FIG. 8, and a specific operation corresponds to the descriptions of FIG. 8, FIG. 9, and FIG. 10.

Figure 12:
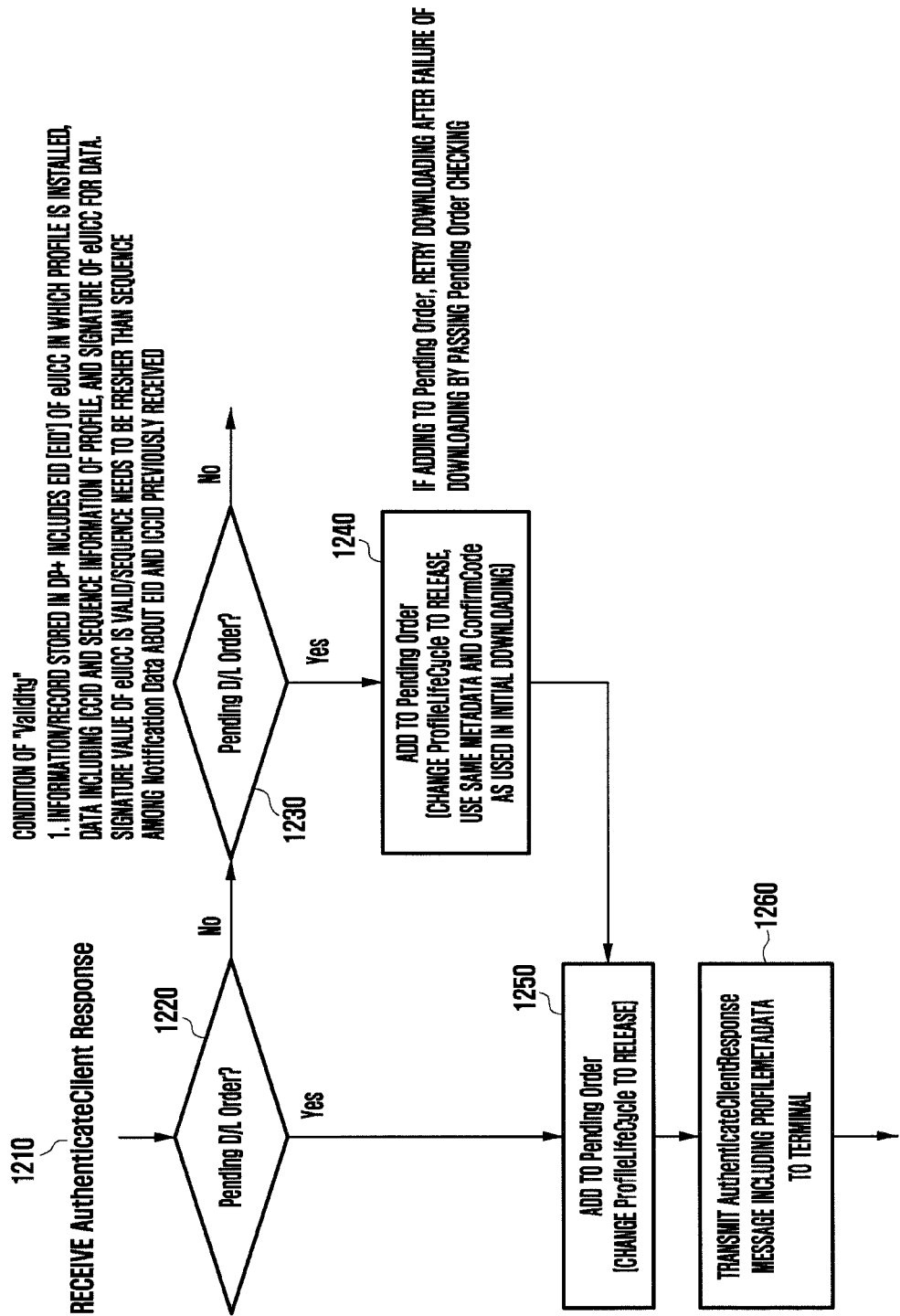
FIG. 12 illustrates the operation of a profile server according to an embodiment of the disclosure.

FIG. 12 illustrates the operation of a profile server according to an embodiment of the disclosure. FIG. 12 may correspond to operations of the profile server 6000 in operation 5014, operation 5016, and operation 5018 of FIG. 3.

Referring to FIG. 12, when the profile server receives an AuthenticateClientRequest (1210), the profile server may check whether there is a pending order for downloading a profile inside using matchingID information or EID information of the AuthenticateClientRequest (1220). When there is no pending order, operation 1230 may be performed, and the profile server may additionally identify whether there is a valid profile deletion verification message in the AuthenticationClientRequest (1230). A validity verification process may be as follows.

Information/record stored in the profile server needs to include the ID (or EID or EID of device 1) of an eUICC in which the profile is installed, data including the ICCID and Seq number information of the profile, and signature information on the eUICC of device 1 for the data. Further, the process includes determining whether the signature value of the eUICC is valid and whether a condition that there is no value equal to or greater than a Seq number included in the AuthenticationClientRequest among Seq numbers included in notification data about the eUICC and the ICCID previously received is satisfied. When the determination process is successful, a request to download the profile may be added to the pending order (1240).

When there is the pending order, the profile server may generate an AuthenticateClientResponse message including profile metadata (1250). The profile server may transmit the AuthenticateClientResponse message including the profile metadata to device 2.

Figure 13:
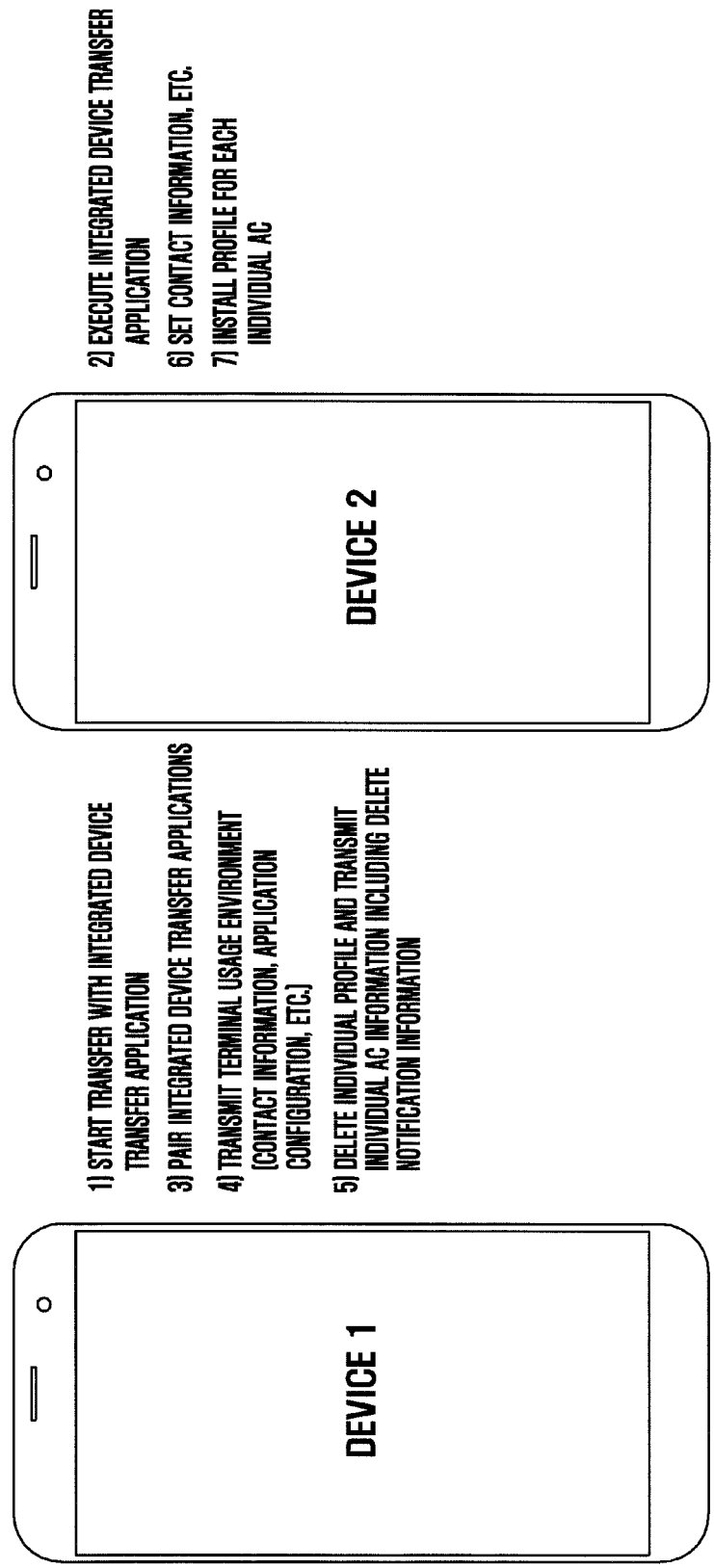
FIG. 13 illustrates a process of transferring a profile from device 1 to device 2 according to an embodiment of the disclosure.

FIG. 13 illustrates a process of transferring a profile from device 1 to device 2 according to an embodiment of the disclosure.

Referring to FIG. 13,

1), 2) Device 1 and device 2 may execute an integrated terminal transfer application, respectively.

3) Device 1 and device 2 may be connected through the integrated terminal transfer application. Here, short-range communication, such as NFC, Wi-Fi, Bluetooth, and UWB, may be used for the connection, or the connection may be established through a server.

4) Device 1 may transmit a terminal usage environment, such as contact information on the terminal, installed application list information, and data in an application, to device 2.

5) Device 1 may perform a profile transfer process for each of profiles installed in an eUICC of device 1 according to the entire or partial operation of the profile transfer process described in the above embodiments. For an effective transfer, one or a plurality of pieces of delete notification information may be transmitted through the connection between the applications established in operation 3) instead of displaying corresponding information as a QR code mentioned in the above embodiments. Instead of displaying the information as the QR code, the information may be transmitted to device 2 via short-range communication, such as NFC, Bluetooth, and UWB, or Wi-Fi communication, or via a server.

6) Device 2 may set an environment the same as or similar to that of device 1 using the information, such as contact information, received from device 1 in 4).

7) Device 2 may install a corresponding profile for each of the one or the plurality of pieces of delete notifications received in 5) according to the process described in FIG. 3. Here, the delete notification information may be converted into an ACToken format for use.

Figure 14:
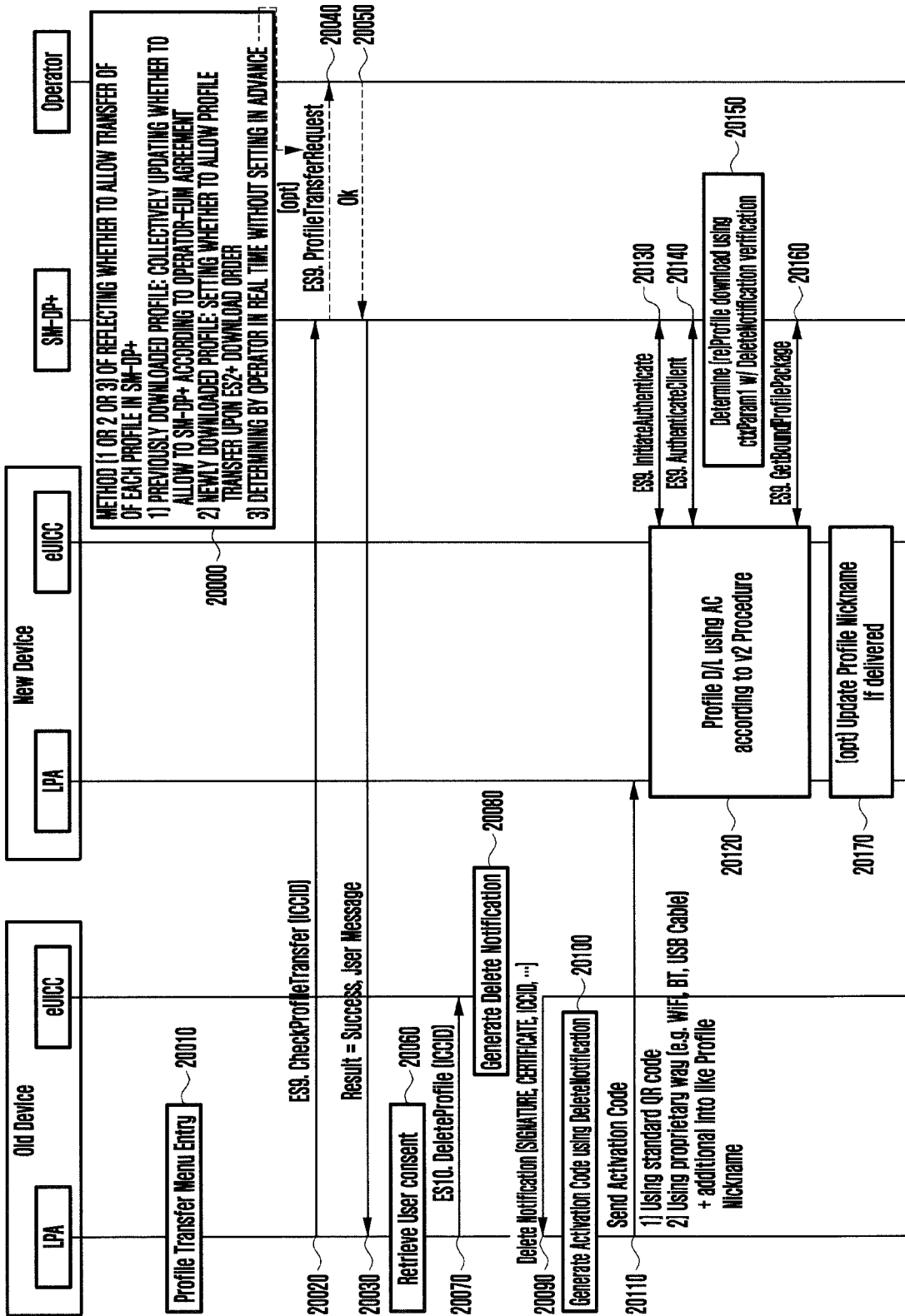
FIG. 14 illustrates a process of transferring a profile according to an embodiment of the disclosure.

FIG. 14 illustrates a process of transferring a profile according to an embodiment of the disclosure.

FIG. 14 may be similar to the above other embodiments including the content of FIG. 4 but shows an operation process for specifically explaining improved details and a newly added operation in a complementary manner.

Referring to FIG. 14, an SM-DP+(or profile server) may perform a mechanism for determining whether to allow a profile transfer of a specific profile. The mechanism may be one of the following methods (operation 20000).

1) Method of configuring the SM-DP+ to allow the profile transfer of all or some profiles 2) Method of configuring whether to allow the profile transfer of a profile when an operator server requests the SM-DP+ server to prepare to download the profile (e.g., including information for configuring whether to allow a profile transfer in a profile download preparation request). The profile download preparation request may be an ES2+ .DownloadOrder, ES2+.ConfirmOrder, or ES2+.ReleaseProfile command message. The information for configuring whether to allow the profile transfer may be included in a message defined separately from the command message.

3) Method of determining whether to allow a profile transfer by the SM-DP+ asking an operator server whenever a device asks the SM-DP+ about a profile transfer request 4) Method for the SM-DP+ to determine to allow the profile transfer of all installed profiles when a terminal identifies version information (e.g., an SVN value) through a message exchange with the SM-DP+ and the version information satisfies a specific condition 5) Method of identifying a profile transfer permission condition (e.g., allowing a specific communication operator code among profiles installed after a specific date, for example, profiles downloaded from the SM-DP+) identified by a terminal in message connection with the SM-DP+ and allowing the profile transfer of all profiles satisfying the condition A user may enter a profile transfer menu in a device from which the profile is to be transferred (referred to as device 1 (old device) for convenience) (operation 20010).

Device 1 may transmit a message for asking whether a profile transfer is allowed to the SM-DP+ in order to perform a profile transfer (operation 20020). The message may include an ICCID. The message may be a message for mutual authentication in a mutual authentication process between device 1 and the SM-DP+. For example, the message may be at least one of an ES9. InitiateAuthenticateRequest or an ES9. AuthenticateClientRequest. Operation 20020 may be omitted depending on a method for allowing the profile transfer. The message for asking whether the profile transfer is allowed may include or omit the ID (e.g., ICCID) of the specific profile ID.

When receiving the message in operation 20020, the SM-DP+ may determine whether to allow the profile transfer of the profile and may transmit a determination result and a message to be displayed to the user to device 1 (operation 20030). Here, the SM-DP+ may determine whether to allow the transfer of the profile using the three methods described in operation 20000. For example, the SM-DP+ may ask the operator server whether to allow the profile transfer in operation 20040 and may receive a result and a message to be displayed to the user in operation 20050, in which case the message in operation 20030 may include part or all of information included in the message in operation 20050.

When the SM-DP+ basically supports the profile transfer, operation 20020 and operation 20030 may be omitted. Alternatively, operation 20020 or operation 20030 may be substituted by identifying version information on a specific SM-DP+ in order to identify whether the SM-DP+ supports a profile transfer. For example, device 1 may transmit the ES9.InitiateAuthenticateRequest message to the SM-DP+ and may determine that the SM-DP+ provide the profile transfer for all profiles using version information on the SM-DP+ or other indicator information transmitted in response.

When it is determined that the profile transfer is possible through the various methods described above, device 1 may display a UI for obtaining the user's consent to the profile transfer using the information in operation 20030 or information set inside in operation 20060.

When the user agrees to the profile transfer, device 1 may delete the profile and may generate an activation code using DeleteNotification information (operation 20070 to operation 20100). Since operation 20070 to operation 20100 may overlap with some or all of operation 6010 to operation 6020 of FIG. 4, a detailed description thereof is omitted in this drawing and a related description thereof corresponds to that of FIG. 4.

Activation code information generated from device 1 in operation 20100 may be 1) transmitted to device 2 (new device) by being displayed on a screen of device 1 as a QR code or 2) transmitted through a Wi-Fi connection, a Bluetooth connection, or a cable connection between device 1 and device 2 (operation 20110). In operation 20110, a profile nickname of the profile may be additionally transmitted when transmitting the activation code information. The profile nickname may be information stored in an eUICC or information stored in an LPA, and the user may set the nickname for the profile through the LPA before a profile transfer operation in this drawing, or the LPA may read the profile nickname from the eUICC in advance and may store the profile name.

Device 2 may download the profile from the SM-DP+ using the activation code information transmitted in operation 20110 (operation 20120). Operation 20120 is described in detail in operation 20130 to operation 20160 as follows.

Device 2 may start a mutual authentication process between device 2 and the SM-DP+ by transmitting an ES9.InitiateAuthenticate request to the SM-DP+. In this process, for device 2 to authenticate the SM-DP+ before transmitting the information received in operation 20110, device 2 generates a random value, includes the random value in the information, and transmits the information to the SM-DP+, and the SM-DP+ generates a server signature value for the information including the random value and transmits the server signature value to device 2 along with a server certificate (operation 20130). Device 2 may transmit an ES9.AuthenticateClientRequest message including the activation code information received in operation 20110 to the SM-DP+. Here, the activation code information may be information including some or all of the DeleteNotification information, as described above. When receiving the information, the SM-DP+ may perform at least one of an operation of verifying that the profile corresponding to the DeleteNotification information has been deleted from the eUICC of device 1 and an operation of determining whether a profile transfer is possible to thereby determine whether to download a profile corresponding to the deleted profile to device 2 and may transmit a determination result to device 2 through an AuthenticateClient Response message (operation 20140 and operation 20150). For example, the SM-DP+ may transmit profile metadata for profile downloading to device 1.

When receiving a response of accepting profile downloading in operation 20140, device 1 may request profile downloading from the SM-DP+ using an ES9.GetBoundProfilePackage in operation 20160, and the SM-DP+ may transmit a corresponding encrypted profile package when receiving the message. Subsequently, device 2 may install the profile in an eUICC of device 2 (operation 20120).

When profile nickname information is also transmitted to device 2 in operation 20110, device 2 may download and install the profile in operation 20120 and may then update an profile nickname of the profile to the profile nickname transmitted in operation 20110 (operation 20170). When this function is used, device 2 does not need to re-perform individual information set by the user for each profile in device 1 when transferring all profiles of device 1 to device 2 as shown in FIG. 13.

Figure 15:
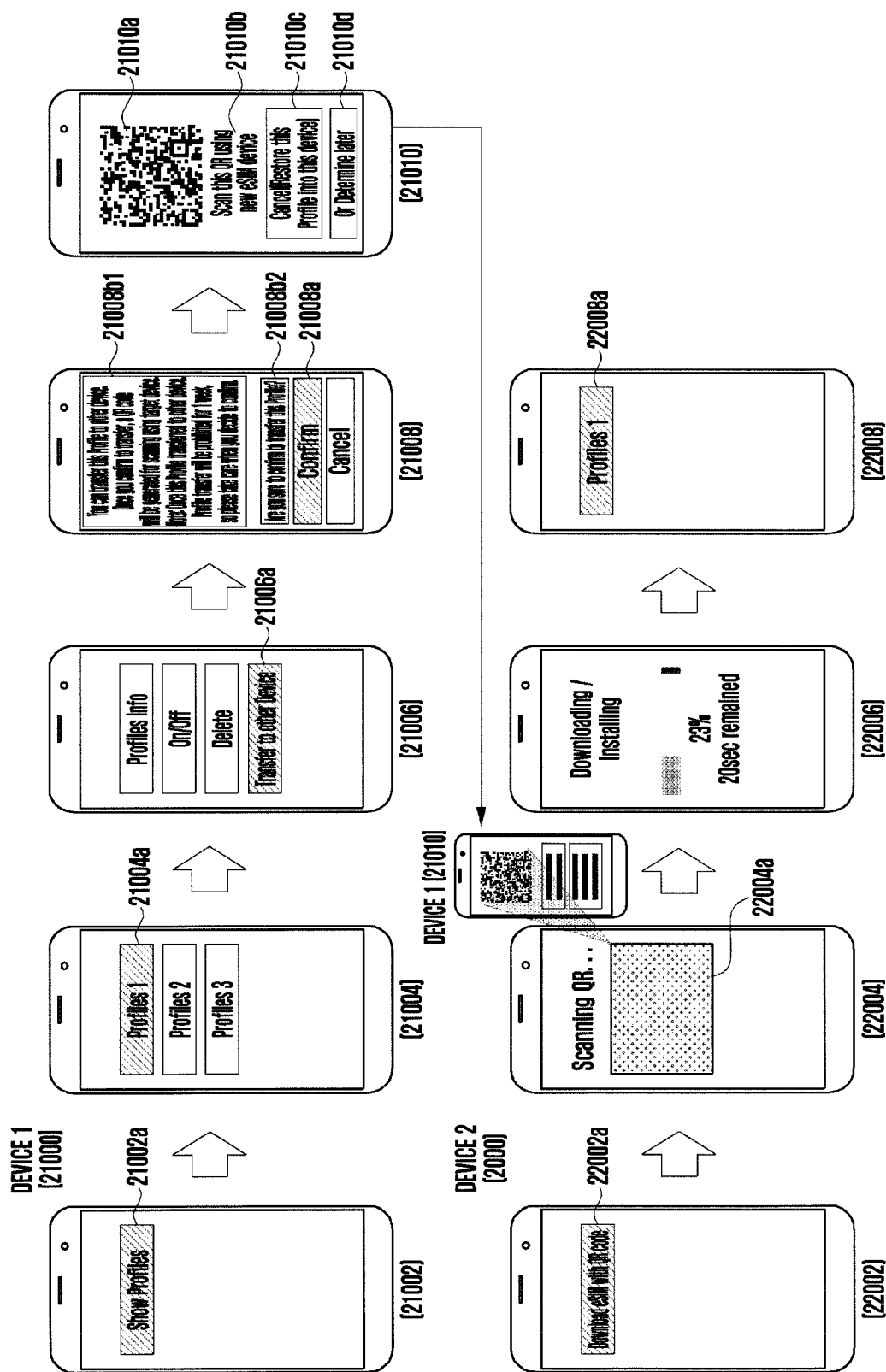
FIG. 15 illustrates a profile transfer according to an embodiment of the disclosure.

FIG. 15 illustrates a profile transfer according to an embodiment of the disclosure.

Referring to FIG. 15, reference may be made to an embodiment of UXs of device 1 21000 and device 2 2000 when a profile is transferred. Operations and screens indicated by 21002 to 22008 in the embodiment of FIG. 15 are substantially similar to operations and screens of the devices indicated by 1002 to 2008 in FIG. 1D but are shown in the separate drawing to indicate the following difference.

Referring to a screen 21008 of FIG. 15, in an operation of obtaining a user's consent to transfer a profile of device 1, device 1 21000 may display information necessary for the user to consent. The information displayed to the user may be information preset in the device or may include at least one of information included in information obtained by asking a profile server whether to allow the transfer of the profile. For example, device 1 21000 may display a user message 21008*b*1 obtained from an SM-DP+ and description information 21008*b*2 preset in device 1 21000 together. The user message obtained from the SM-DP+ may be the user message transmitted in operation 20030 in FIG. 14. Various messages related to the profile transfer may be transmitted to the user through the user message. A relevant embodiment is illustrated in FIG. 16.

Figure 16:
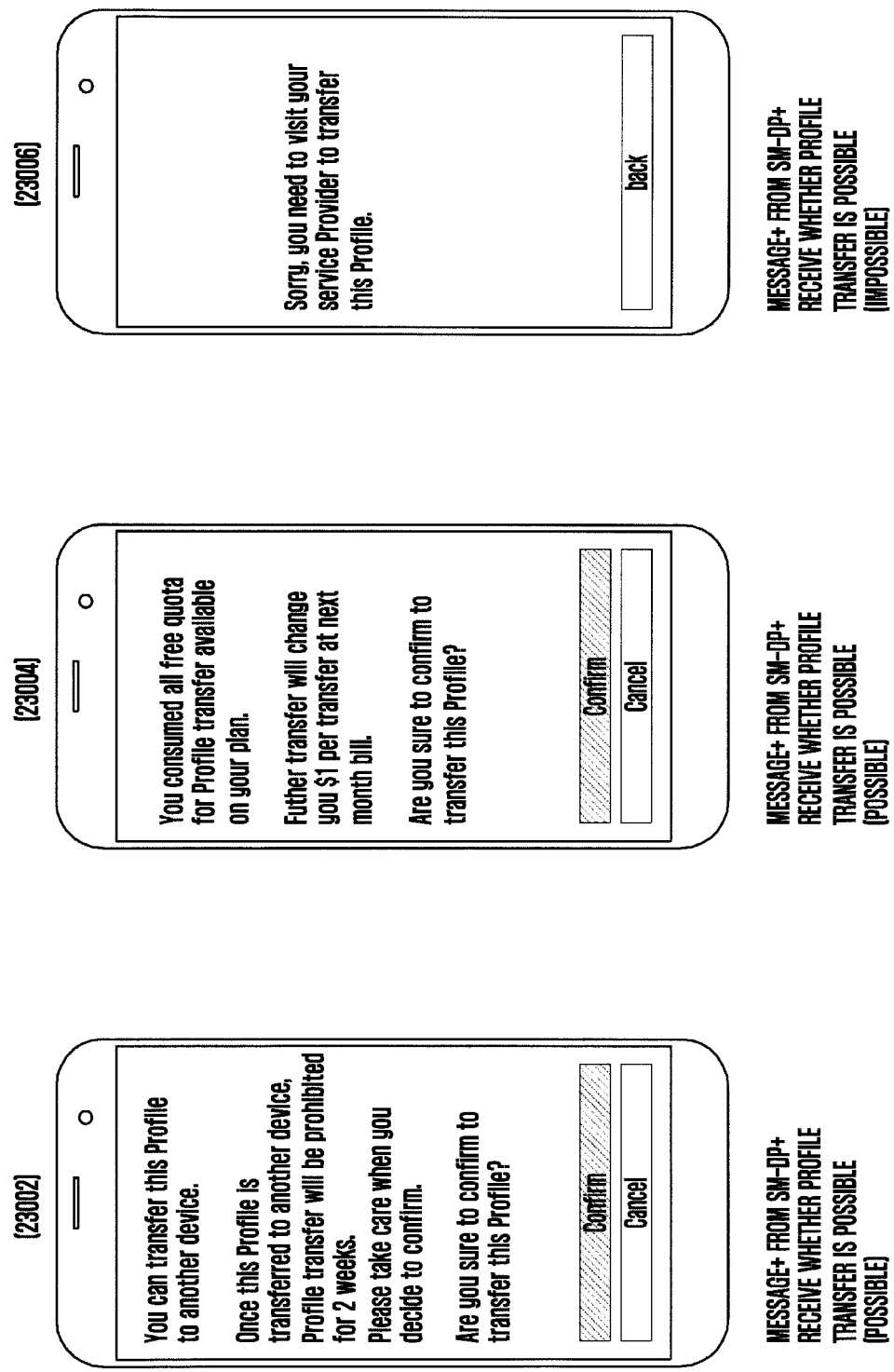
FIG. 16 illustrates a message displayed to a user when a profile is transferred according to an embodiment of the disclosure.

FIG. 16 shows an example of a message that can be displayed to a user when a profile is transferred.

FIG. 16 illustrates a message displayed to a user when a profile is transferred according to an embodiment of the disclosure.

Various embodiments of FIG. 16 show configuration examples of a screen of operation 1008 in FIG. 1D or a screen of operation 21008 in FIG. 15.

23002 shows a case where the result of whether to allow the profile transfer is Success and the user message is transmitted as follows in operation 20030 of FIG. 14:

"You can transfer this Profile to another device.

Once this Profile is transferred to another device, Profile transfer will be prohibited for 2 weeks.

Please take care when you decide to confirm."

Since the result is Success, as set in device 1, a message "Are you sure to confirm to transfer this Profile?" may be also displayed. When the result is Success, a menu for confirming or, nonetheless, canceling the profile transfer may be provided for the user.

23004 shows a case where the result of whether to allow the profile transfer is Success and the user message is transmitted as follows in operation 20030 of FIG. 14:

"You consumed all free quota for Profile transfer available on your plan.

Further transfer will charge you $1 per transfer at next month bill." Likewise, since the result is Success, as set in device 1, a message "Are you sure to confirm to transfer this Profile?" may be also displayed. When the result is Success, a menu for confirming or canceling, nonetheless, the profile transfer may be provided for the user.

23006 shows a case where, in operation 20030 of FIG. 14, the result of whether to allow the profile transfer is Reject and the user message, such as "Sorry, you need to visit your service Provider to transfer this Profile."

may be displayed.

When the result is Reject, a menu for canceling (or going back) the profile transfer may be displayed to the user, instead of a menu for confirming the profile transfer.

As described above, in the disclosure, since the profile of device 1 needs to be deleted in order to transfer the profile, various relevant user guide messages may be configured.

Although not shown in the drawing, instead of agreeing to the user message and immediately deleting the profile, when the user agrees to the user message, device 1 may transmit consent to the profile transfer back to the SM-DP+, the SM-DP+ may provide information on whether to additionally allow the profile transfer or code information additionally needed for the profile transfer to device 1, device 1 may transmit this information to device 2, and device 2 may transmit the information to the SM-DP+ and may download the profile.

Figure 17:
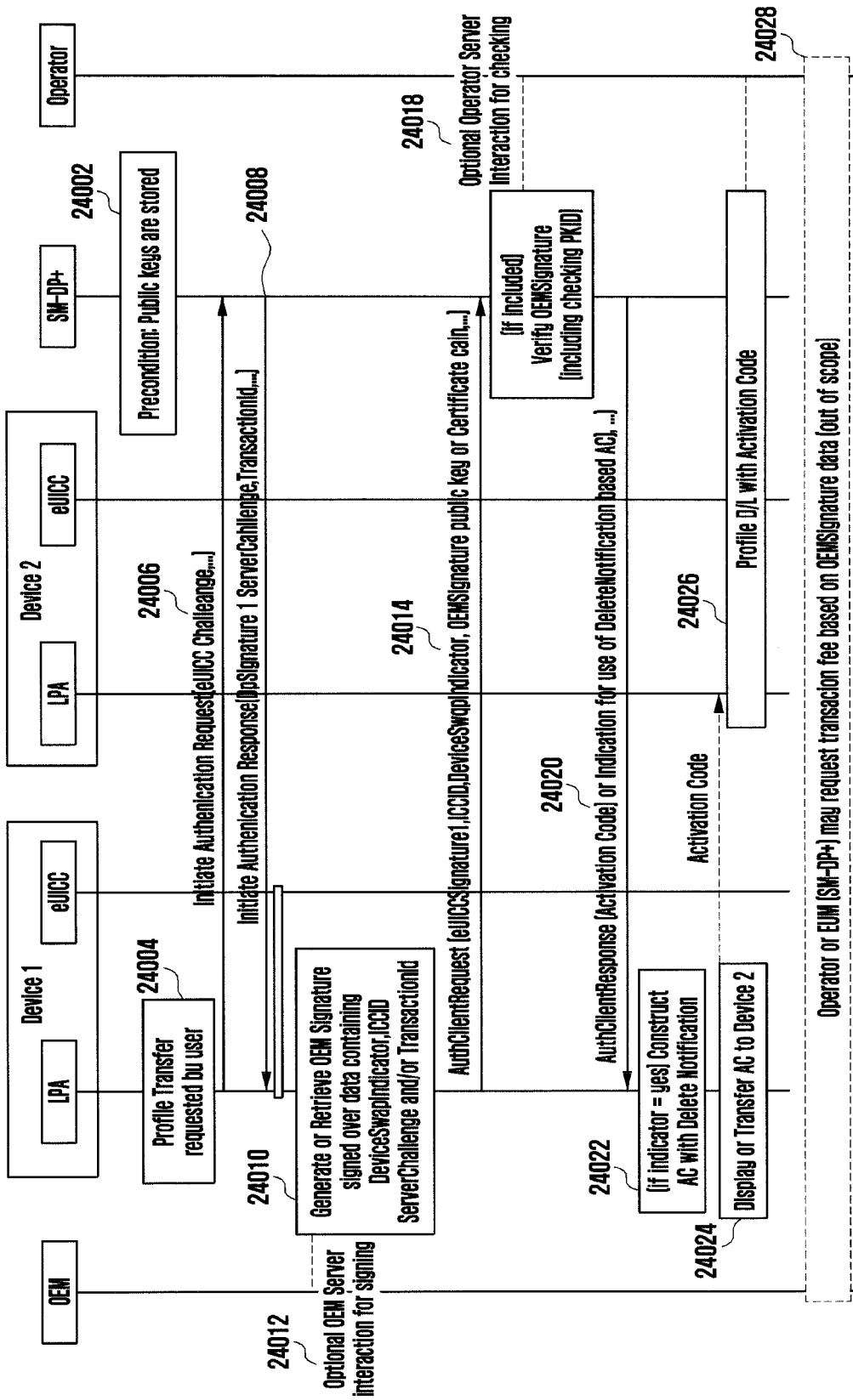
FIG. 17 illustrates a profile transfer process according to an embodiment of the disclosure.

FIG. 17 illustrates a profile transfer process according to an embodiment of the disclosure.

An operation of allowing a profile transfer based on a public key preregistered in a profile server or information corresponding to the public key when a profile is transferred is described with reference to FIG. 17. For example, when a public key for signature of a terminal manufacturer or the ID of the public key is stored in a profile server (SM-DP+) by consent between the terminal manufacturer and a communication service provider, the SM-DP+ may allow a profile transfer for a subsequent profile transfer request including a digital signature corresponding to the public key. A specific example is illustrated in FIG. 17.

Device 1 may have an eUICC and an LPA installed. However, the LPA may be outside device 1. For example, when repairing a terminal, the terminal manufacturer may connect an AS device and device 1 and may perform a device transfer by controlling the eUICC using an LPA of the AS device. For convenience, a description is made assuming that the LPA is present in device 1, including a case where device 1 is connected to the AS device.

First, a public key, a certificate corresponding to the public key, a public key identifier (PKID) value, or an identifier that can be subsequently included in a signature value may be stored in advance in the SM-DP+(24002). Alternatively, even though not stored in operation 24002, necessary information may be obtained in operation 24018 below.

A user may input a profile transfer through the LPA of device 1 (24004). The profile transfer may be input through a screen of device 1 or may be input by an LPA of a different device, for example, the AS device, connected to device 1. Here, a specific profile or a profile ID may be specified through the LPA. The operation of inputting the profile transfer is not limited to the above example.

The LPA of device 1 may transmit an Initiate Authentication Request to the SM-DP+(24006). The Initiate Authentication Request message may include eUICC challenge information or the like. The SM-DP+ may transmit an InitiateAuthentication Response to device 1 (24008). The InitiateAuthentication Response may include a signature of the SM-DP+, server challenge, TransactionId, and the like.

The LPA of device 1 may generate digital signature data (24010). The LPA of device 1 may generate digital signature data using a private key of an OEM for data including at least one value of a profile transfer indicator, an ICCID, a ServerChallenge, or a TransactionID. When the signature data is generated, a signature may be generated by the LPA of device 1, but may be generated through a separate server or device of the terminal manufacturer and may be transmitted to the LPA of device 1 (24012).

The LPA of device 1 may transmit an AuthClientRequest to the SM-DP+(24014). The AuthClientRequest may include at least one of an OEMSignature, the ICCID, the profile transfer indicator, a public key, a public key ID, or a certificate chain. When the OEM signature is included, the SM-DP+ may verify the OEM signature, and may also verify whether the OEM signature corresponds to information, such as the public key, registered in operation 24002. The verification may be performed through an operator server (24018).

When the OEM signature passes the verification, the SM-DP+ may transmit an AuthClientResponse to the LPA of device 1 (24020). The AuthClientResponse may include an indicator indicating whether to generate an AC based on an ActivationCode or DeleteNotifciation.

Device 1 may determine whether the indicator indicates use of the AC through the DeleteNotification. When the indicator indicates the use of the AC through the DeleteNotification, the LPA of device 1 may delete the profile and may generate an activation code using the Delete Notification (24022). A process of deleting the profile, obtaining the Delete Notification, and generating the activation code using the Delete Notification has been described in detail in other embodiments of the disclosure, and thus a detailed description thereof is omitted. The LPA of device 1 may display the activation code or the activation code received in operation

24020 as a QR code on the screen of the terminal or may transmit the same to device 2 (24024). Device 2 may scan the displayed QR code or may download the profile from the SM-DP+ using the received activation code (24026). When a Delete Notification-based AC is transmitted while downloading the profile, the SM-DP+ may verify the DeleteNotification and may then download the profile.

In this profile transfer involving the OEMSignature, the SM-DP+ or operator may record the OEMSignature and additional data together whenever the profile transfer is performed. In operation 24028, the terminal manufacturer and the communication service provider or the SM-DP+ provider may mutually verify the number of profile transfers using the data and may calculate costs, based on the number.

Figure 18:
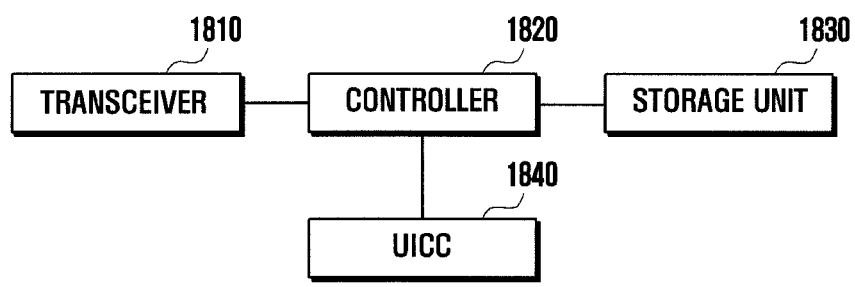
FIG. 18 illustrates the structure of a terminal according to an embodiment of the disclosure.

FIG. 18 illustrates the structure of a terminal according to an embodiment of the disclosure.

Referring to FIG. 18, the terminal may include a transceiver 1810, a controller 1820, and a storage unit 1830. In the embodiment of the disclosure, the controller 1820 may include a circuit, an application-specific integrated circuit, or at least one processor. In the embodiment of the disclosure, the terminal may further include at least one UICC 1840. The UICC 1840 may be embedded in the terminal or may be detachably coupled to the terminal. The terminal may correspond to a device that transfers a profile, a device that downloads a profile, or the like according to various embodiments of the disclosure.

The transceiver 1810 may transmit or receive a signal to or from a different network entity.

The controller 1820 may control the overall operation of the terminal according to an embodiment proposed herein. For example, the controller 1820 may control signal flow between blocks to perform the operation of the terminal according to the flowcharts described above.

The storage unit 1830 may store at least one of information transmitted or received through the transceiver, or information generated through the controller.

The operation of an LPA according to various embodiments of the disclosure may be construed as the operation of the controller 1820. Further, the operation of the LPA may be construed as an operation according to control by the controller 1820.

Figure 19:
FIG. 19 illustrates the structure of a profile server according to an embodiment of the disclosure.

FIG. 19 illustrates the structure of a profile server according to an embodiment of the disclosure.

Referring to FIG. 19, the profile server may include a transceiver 1910, a controller 1920, and a storage unit 1930. For example, the profile server may include at least one of an SM-DP, an SM-DP+, or an SM-DS.

The transceiver 1910 may transmit or receive a signal to or from a different network entity.

The controller 1920 may control the overall operation of the profile server according to an embodiment proposed herein. For example, the controller may control signal flow between blocks to perform the operation of the profile server according to the flowcharts described above.

The storage unit 1930 may store at least one of information transmitted or received through the transceiver, or information generated through the controller.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first terminal, the method comprising:

receiving an input to transfer a profile installed in the first terminal;

deleting the profile from a first universal integrated circuit card (UICC) of the first terminal;

generating data including information indicating a deletion of the profile and a profile server address for a second terminal to download the profile; and outputting the data as information obtainable by the second terminal, wherein the data is used for the second terminal to obtain the profile.

2. The method as claimed in claim 1, wherein the data corresponds to an access token of an activation code, and wherein the obtainable information is a quick response (QR) code corresponding to a format of the activation code.

3. The method as claimed in claim 1, wherein the data includes at least one of identification information on the profile or a certificate of the first UICC.

4. A method performed by a second terminal, the method comprising:

obtaining data including information on a profile deleted from a first universal integrated circuit card (UICC) of a first terminal;

transmitting a first message including identification information on the profile and deletion information on the profile to a profile server based on the data;

receiving metadata about the profile based on the identification information on the profile and the deletion information on the profile;

transmitting a second message including a download request for the profile to the profile server based on the metadata; and downloading the profile from the profile server.

5. The method as claimed in claim 4, wherein the first message further includes signature information on the first UICC and signature information on a second UICC of the second terminal, wherein the data corresponds to an access token of an activation code, wherein the data is obtained from a quick response (QR) code corresponding to a format of the activation code, and wherein the data includes at least one of the identification information on the profile, a profile server address for the second terminal to download the profile, indication information indicating deletion of the profile, or a certificate of the first UICC.

6. A method performed by a profile server, the method comprising:

receiving a first message including identification information on a profile deleted from a first terminal and deletion information on the profile from a second terminal;

generating metadata about the profile based on the identification information on the profile and the deletion information on the profile;
transmitting the metadata to the second terminal;
receiving a second message including a download request for the profile from the second terminal; and
transmitting the profile to the second terminal.

7. The method as claimed in claim 6,
wherein the second terminal obtains the identification information on the deleted profile and the deletion information on the profile from the first terminal, and
wherein the first message further includes signature information on a first UICC of the first terminal and signature information on a second UICC of the second terminal.

8. The method as claimed in claim 6,
wherein the data corresponds to an access token of an activation code,
wherein the data is obtained from a quick response (QR) code corresponding to a format of the activation code, and
wherein the data includes at least one of the identification information on the profile, a profile server address for the second terminal to download the profile, indication information indicating deletion of the profile, or a certificate of the first UICC.

9. A first terminal comprising:
a transceiver;
a first universal integrated circuit card (UICC); and
a controller configured to:
receive an input to transfer a profile installed in the first terminal,
delete the profile from a first UICC,
generate data including information indicating a deletion of the profile and a profile server address for a second terminal to download the profile, and
output the data as information obtainable by the second terminal, wherein the data is used for the second terminal to obtain the profile.

10. The first terminal as claimed in claim 9,
wherein the data corresponds to an access token of an activation code, and
wherein the obtainable information is a quick response (QR) code corresponding to a format of the activation code.

11. The first terminal as claimed in claim 9, wherein the data includes at least one of identification information on the profile or a certificate of the first UICC.

12. A second terminal comprising:
a transceiver;
a second universal integrated circuit card (UICC); and
a controller configured to:
obtain data including information on a profile deleted from a first UICC of a first terminal,
transmit a first message including identification information on the profile and deletion information on the profile to a profile server based on the data,
receive metadata about the profile based on the identification information on the profile and the deletion information on the profile,
transmit a second message including a download request for the profile to the profile server based on the metadata, and
download the profile from the profile server.

13. The second terminal as claimed in claim 12,
wherein the first message further includes signature information on the first UICC and signature information on a second UICC of the second terminal,
wherein the data corresponds to an access token of an activation code,
wherein the data is obtained from a quick response (QR) code corresponding to a format of the activation code, and
wherein the data includes at least one of the identification information on the profile, a profile server address for the second terminal to download the profile, indication information indicating deletion of the profile, or a certificate of the first UICC.

14. A profile server comprising:
a transceiver; and
a controller configured to:
receive a first message including identification information on a profile deleted from a first terminal and deletion information on the profile from a second terminal,
generate metadata about the profile based on the identification information on the profile and the deletion information on the profile,
transmit the metadata to the second terminal,
receive a second message including a download request for the profile from the second terminal, and
transmit the profile to the second terminal.

15. The profile server as claimed in claim 14, the second terminal obtains the identification information on the deleted profile and the deletion information on the profile from the first terminal,
wherein the first message further includes signature information on a first UICC of the first terminal and signature information on a second UICC of the second terminal,
wherein the data corresponds to an access token of an activation code,
wherein the data is obtained from a quick response (QR) code corresponding to a format of the activation code, and
wherein the data includes at least one of the identification information on the profile, a profile server address for the second terminal to download the profile, indication information indicating deletion of the profile, or a certificate of the first UICC.

* * * * *